(12) United States Patent
Rosset et al.

(10) Patent No.: US 12,099,552 B2
(45) Date of Patent: Sep. 24, 2024

(54) USING A MULTI-TASK-TRAINED NEURAL NETWORK TO GUIDE INTERACTION WITH A QUERY-PROCESSING SYSTEM VIA USEFUL SUGGESTIONS

(71) Applicant: Microsoft Technology Licensing, LLC, Redmond, WA (US)

(72) Inventors: Corby Louis Rosset, Seattle, WA (US); Chenyan Xiong, Bellevue, WA (US); Paul Nathan Bennett, Redmond, WA (US); Saurabh Kumar Tiwary, Bellevue, WA (US); Daniel Fernando Campos, Seattle, WA (US); Xia Song, Redmond, WA (US); Nicholas Eric Craswell, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/387,480

(22) Filed: Nov. 7, 2023

(65) Prior Publication Data
US 2024/0070202 A1 Feb. 29, 2024

Related U.S. Application Data

(63) Continuation of application No. 16/850,886, filed on Apr. 16, 2020, now Pat. No. 11,853,362.

(51) Int. Cl.
*G06F 16/00* (2019.01)
*G06F 16/9032* (2019.01)
(Continued)

(52) U.S. Cl.
CPC ........ *G06F 16/90324* (2019.01); *G06F 17/16* (2013.01); *G06F 18/24* (2023.01); *G06N 5/04* (2013.01); *G06N 20/00* (2019.01)

(58) Field of Classification Search
CPC .... G06F 16/90324; G06F 18/24; G06F 17/16; G06N 20/00
(Continued)

(56) References Cited

U.S. PATENT DOCUMENTS 9,405,856 B2 8/2016 Marantz et al.
9,519,870 B2 12/2016 Sarikaya et al.
(Continued)

OTHER PUBLICATIONS

U.S. Appl. No. 16/296,054, filed Mar. 7, 2019.
(Continued)

*Primary Examiner* — Alexandria Y Bromell

(57) ABSTRACT

A computer-implemented technique is described herein for assisting a user in advancing a task objective. The technique uses a suggestion-generating system (SGS) to provide one or more suggestions to a user in response to at least a last-submitted query provided by the user. The SGS may correspond to a classification-type or generative-type neural network. The SGS uses a machine-trained model that is trained using a multi-task training framework based on plural groups of training examples, which, in turn, are produced using different respective example-generating methods. One such example-generating method constructs a training example from queries in a search session. It operates by identifying the task-related intent the queries, and then identifying at least one sequence of queries in the search session that exhibits a coherent task-related intent. A training example is constructed based on queries in such a sequence.

20 Claims, 15 Drawing Sheets

(51) Int. Cl.
G06F 17/16 (2006.01)
G06F 18/24 (2023.01)
G06N 5/04 (2023.01)
G06N 20/00 (2019.01)

(58) Field of Classification Search
USPC .......................................................... 706/12
See application file for complete search history.

(56) References Cited

U.S. PATENT DOCUMENTS

| | | | |
|---|---|---|---|
| 9,594,837 | B2 | 3/2017 | Raman et al. |
| 9,600,231 | B1 | 3/2017 | Sun et al. |
| 10,706,450 | B1 | 7/2020 | Tavernier |
| 11,138,285 | B2 | 10/2021 | Zhang et al. |
| 2011/0066650 | A1 | 3/2011 | Fuxman et al. |
| 2011/0314010 | A1 | 12/2011 | Ganti et al. |
| 2012/0290575 | A1 | 11/2012 | Hu et al. |
| 2013/0282682 | A1 | 10/2013 | Batraski et al. |
| 2014/0337005 | A1 | 11/2014 | Abdel-Hady et al. |
| 2017/0032035 | A1 | 2/2017 | Gao et al. |
| 2019/0042956 | A1 | 2/2019 | Huang et al. |
| 2019/0130231 | A1 | 5/2019 | Liu et al. |
| 2019/0140997 | A1 | 5/2019 | Lewin-Eytan et al. |
| 2019/0188295 | A1 | 6/2019 | Sirotkovic et al. |
| 2019/0197099 | A1 | 6/2019 | Frolov |
| 2020/0285687 | A1* | 9/2020 | Zhang .................. G06F 18/2148 707/707 |
| 2020/0335187 | A1* | 10/2020 | Lefkofsky .............. G16H 50/50 707/707 |
| 2021/0286851 | A1* | 9/2021 | Kota ........................ G06N 5/04 707/707 |

OTHER PUBLICATIONS

Aliannejadi, et al., "Asking Clarifying Questions in Open-Domain Information-Seeking Conversations," in Proceedings of the 42nd International ACM SIGIR Conference on Research and Development in Information Retrieval (SIGIR 2019), Jul. 2019, pp. 475-484.
Vaswani, et al., "Attention Is All You Need," arXiv:1706.03762v5 [cs.CL], Dec. 6, 2017, 15 pages.
Cao, et al., "Context-Aware Query Suggestion by Mining Click-Through and Session Data," in Proceedings of the 14th ACM SIGKDD International Conference on Knowledge Discovery and Data Mining (KDD '08), Aug. 2008, pp. 875-883.
Croft, et al., Search Engines: Information Retrieval in Practice, available at https://ciir.cs.umass.edu/downloads/SEIRiP.pdf, Center for Intelligent Information Retrieval, University of Massachusetts Amherst, 2015, 542 pages.
Zhang, et al., "Towards Conversational Search and Recommendation: System Ask, User Respond," in Proceedings of the 27th ACM International Conference on Information and Knowledge Management (CIKM 2018), Oct. 2018, pp. 177-186.
Dai, et al., "Deeper Text Understanding for IR with Contextual Neural Language Modeling," in Proceedings of the 42nd International ACM SIGIR Conference on Research and Development in Information Retrieval (SIGIR '19), Jul. 2019, pp. 985-988.
Devlin, et al., "BERT: Pre-training of Deep Bidirectional Transformers for Language Understanding," in Proceedings of the 2019 Conference of the North American Chapter of the Association for Computational Linguistics: Human Language Technologies (NAACL 2019), Association for Computational Linguistics, Jun. 2019, pp. 4171-4186.
Fishkin, Rand, "Less than Half of Google Searches Now Result in a Click," available at sparktoro.com/blog/less-thanhalf-of-google-searches-now-result-in-a-click/, accessed Apr. 9, 2020, blog dated Aug. 13, 2019, Sparktor Blog, 8 pages.
Gao, et al., "Neural Approaches to Conversational AI: Question Answering, Task-Oriented Dialogues and Social Chatbots," arXiv:1809.08267v3 [cs.CL], Sep. 10, 2019, 95 pages.
Jain, et al., "Slice: Scalable Linear Extreme Classifiers Trained on 100 Million Labels for Related Searches," in Proceedings of the Twelfth ACM International Conference on Web Search and Data Mining (WSDM 2019), Feb. 2019, pp. 528-536.
Joachims, et al., "Unbiased Learning-to-Rank with Biased Feedback," in Proceedings of the Tenth ACM International Conference on Web Search and Data Mining (WSDM 2017), Feb. 2017, pp. 781-789.
Keskar, et al., "CTRL: A Conditional Transformer Language Model for Controllable Generation," arXiv:1909.05858v2 [cs.CL], Sep. 20, 2019 18 pages.
Lan, et al., "ALBERT: A Lite BERT for Self-supervised Learning of Language Representations," in Proceedings of the Eighth International Conference on Learning Representations (ICLR 2020), Mar. 2020, 17 pages.
Zhang, et al., "Generic Intent Representation in Web Search," in Proceedings of the 42nd International ACM SIGIR Conference on Research and Development in Information Retrieval (SIGIR 2019), Jul. 2019, pp. 65-74.
Liu, et al., "Multi-Task Deep Neural Networks for Natural Language Understanding," in Proceedings of the 57th Annual Meeting of the Association for Computational Linguistics, Association for Computational Linguistics, Jul. 2019, pp. 4487-4496.
Liu, et al., "RoBERTa: A Robustly Optimized BERT Pretraining Approach," arXiv:1907.11692v1 [cs.CL], Jul. 26, 2019, 13 pages.
Luo, et al., "Session Search by Direct Policy Learning," in Proceedings of the 2015 International Conference on The Theory of Information Retrieval (ICTIR 2015), Sep. 2015, pp. 261-270.
Luo, et al., "Win-Win Search: Dual-Agent Stochastic Game in Session Search," in Proceedings of the 37th international ACM SIGIR conference on Research & Development in Information Retrieval (SIGIR 2014), Jul. 2014, pp. 587-596.
Macavaney, et al., "CEDR: Contextualized Embeddings for Document Ranking," in Proceedings of the 42nd International ACM SIGIR Conference on Research and Development in Information Retrieval (SIGIR 2019), Jul. 2019, pp. 1101-1104.
Nogueira, et al., "Passage Re-ranking with BERT," arXiv: 1901.04085v4 [cs.IR], Feb. 18, 2019, 5 pages.
Padigela, et al., "Investigating the Successes and Failures of BERT for Passage Re-Ranking," arXiv:1905.01758v1 [cs.IR], May 5, 2019, 5 pages.
Peters, et al., "Deep contextualized word representations," in Proceedings of the 2018 Conference of the North American Chapter of the Association for Computational Linguistics: Human Language Technologies (NACCL 2018), Jun. 2018, pp. 2227-2237.
Qiao, et al., "Understanding the Behaviors of BERT in Ranking," arXiv:1904.07531v4 [cs.IR], Apr. 26, 2019, 4 pages.
Radford, et al., "Language Models are Unsupervised Multitask Learners," available at https://openai.com/blog/better-language-models/, OpenAI, 2019, 24 pages.
Radlinski, et al., "A Theoretical Framework for Conversational Search," in Proceedings of the 2017 Conference on Conference Human Information Interaction and Retrieval (CHIIR 2017), Mar. 2017, pp. 117-126.
Raffel, et al., "Exploring the Limits of Transfer Learning with a Unified Text-to-Text Transformer," arXiv:1910.10683v2 [cs.LG], Oct. 24, 2019, 53 pages.
Raman, et al., "Toward Whole-Session Relevance: Exploring Intrinsic Diversity in Web Search," in Proceedings of the 36th International ACM SIGIR Conference on Research and Development in Information Retrieval (SIGIR 2013), Jul. 2013, pp. 463-472.
Raman, et al., "Understanding Intrinsic Diversity in Web Search: Improving Whole-Session Relevance," in Transactions on Information Systems (TOIS), vol. 32, No. 4, Article No. 20, Oct. 2014, pp. 1-45.
Rao, et al., "Learning to Ask Good Questions: Ranking Clarification Questions using Neural Expected Value of Perfect Information," arXiv:1805.04655v2 [cs.CL], Jun. 12, 2018, 10 pages.
Rao, et al., "Answer-based Adversarial Training for Generating Clarification Questions," arXiv:1904.02281v1 [cs.CL], Apr. 4, 2019, 14 pages.
Sordoni, et al., "A Hierarchical Recurrent Encoder-Decoder for Generative Context-Aware Query Suggestion," in Proceedings of

(56) References Cited

OTHER PUBLICATIONS the 24th ACM International on Conference on Information and Knowledge Management (CIKM 2015), Oct. 2015, pp. 553-562.

Tang, et al., "Target-Guided Open-Domain Conversation," in Proceedings of the 57th Annual Meeting of the Association for Computational Linguistics, Association for Computational Linguistics, Jul. 2019, pp. 5624-5634.

Wu, et al., "Query Suggestion with Feedback Memory Network," in Proceedings of the 2018 World Wide Web Conference. International World Wide Web Conferences Steering Committee, Apr. 2018, pp. 1563-1571.

Yang, et al., "XLNet: Generalized Autoregressive Pretraining for Language Understanding," in Advances in Neural Information Processing Systems 32 (NIPS 2019), Dec. 2019, 11 pages.

Baeza-Yates, et al., "Query Recommendation Using Query Logs in Search Engines," in Proceedings of Current Trends in Database Technology (EDBT 2004), Springer, Lecture Notes in Computer Science, vol. 3268, Mar. 2004, 10 pages.

Carterette, et al., "Overview of the TREC 2014 Session Track," in Proceedings of The 23rd Text Retrieval Conference (TREC 2014), 2014, 15 pages.

Croft, et al., "I3R: A New Approach to the Design of Document Retrieval Systems," in Journal of the American Society for Information Science, vol. 38, No. 6, 1987, pp. 389-404, first page only, available at https://search.proquest.com/openview/88c389b976c22e49aa16ca95a9379929/1?pq-origsite=gscholar&cbl=41136, ProQuest Document Preview, accessed on Apr. 20, 2020, 1 page.

Liu, et al., "Learning to Rank for Information Retrieval," in Foundations and Trends® in Information Retrieval, vol. 3, No. 3, 2009, pp. 225-331.

Rosset, et al., "Leading Conversational Search by Suggesting Useful Questions," available at https://dl.acm.org/doi/fullHtml/10.1145/3366423.3380193, in Proceedings of The Web Conference 2020 (WWW '20), Taipei, Taiwan, Apr. 20, 2020, retrieved on Apr. 28, 2020, 27 pages.

Lin, et al., "Question Answering from the Web Using Knowledge Annotation and Knowledge Mining Techniques," in Proceedings of the Twelfth International Conference on Information and Knowledge Management (CIKM '03), Nov. 2003, pp. 116-123.

PCT Search Report and Written Opinion in PCT/US2020/015999, mailed on Apr. 24, 2020, 18 pages.

"Follow-up intents," available at https://cloud.google.com/dialogflow/es/docs/contexts-follow-up-intents, Dialogflow ES documentation, Google Cloud, accessed on Jul. 23, 2023, 2 pages.

"Follow-up intents," available at https://web.archive.org/web/20200920182337/https://cloud, The Wayback Machine, accessed on Jul. 24, 2023, 2 pages.

PCT Search and Written Opinion for PCT Application No. PCT/US2021/018269, mailed on May 25, 2021, 15 pages.

* cited by examiner

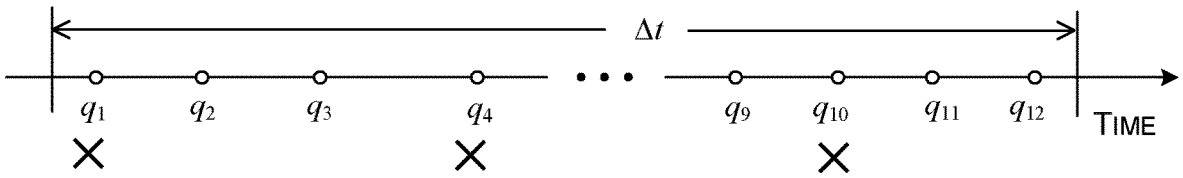
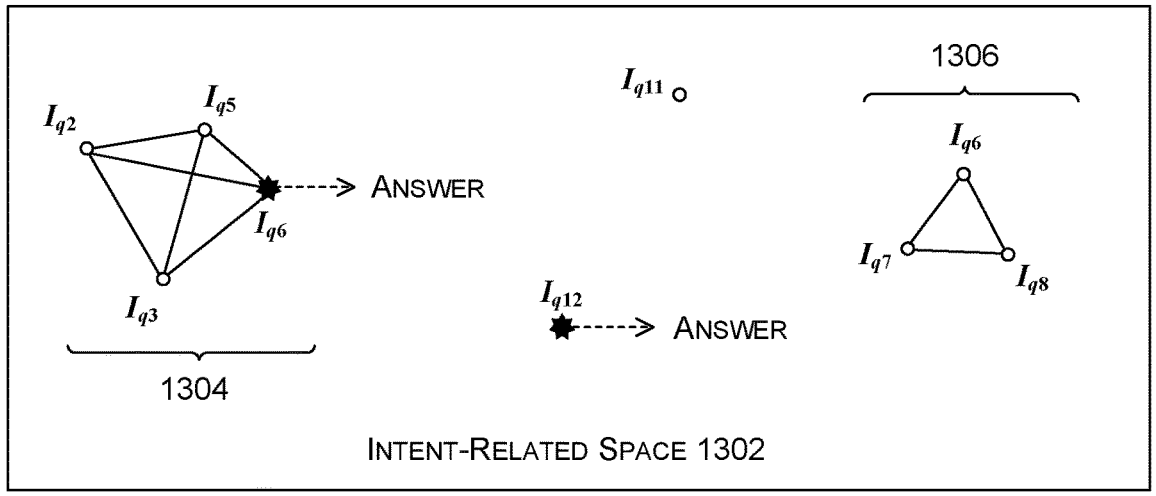
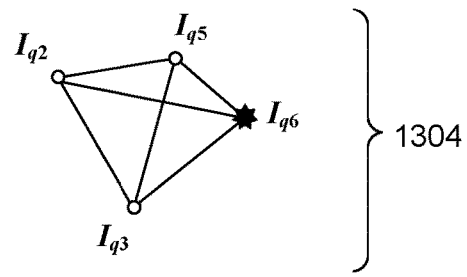
TRAINING EXAMPLE, E.G.,
$([CLS] \circ q_2 \circ [NQY] \circ q_3 \circ [NQY] \circ q_5 \circ [SEP] \circ q_6 \circ [SEP])$ } 1308
FIG. 13

OVERVIEW OF THE OPERATION OF THE QUERY-PROCESSING SYSTEM 1402

RECEIVE A QUERY PROVIDED BY A USER COMPUTING DEVICE, VIA A COMPUTER NETWORK.
1404

GENERATE AT LEAST ONE SUGGESTION BASED ON THE QUERY USING A FIRST MACHINE-TRAINED MODEL, THE FIRST MACHINE-TRAINED MODEL BEING TRAINED USING A MULTI-TASK TRAINING FRAMEWORK THAT INTERLEAVES TRAINING EXAMPLES SELECTED FROM PLURAL GROUPS OF TRAINING EXAMPLES, THE PLURAL GROUPS OF TRAINING EXAMPLES PRODUCED BY PLURAL EXAMPLE-GENERATING METHODS THAT DIFFER FROM EACH OTHER. FOR A FIRST GROUP OF TRAINING EXAMPLES, A TRAINING EXAMPLE PROVIDES A SEQUENCE OF QUERIES IN A SEARCH SESSION THAT HAVE BEEN DETERMINED TO EXHIBIT A COHERENT TASK-RELATED INTENT BY: USING A SECOND MACHINE-TRAINED MODEL TO IDENTIFY INTENTS ASSOCIATED WITH THE RESPECTIVE QUERIES; AND THEN DETERMINING RELATIONSHIPS AMONG THE INTENTS.
1406

GENERATE OUTPUT INFORMATION TO BE SENT TO THE USER COMPUTING DEVICE THAT INCLUDES THE AT LEAST ONE SUGGESTION, AND SEND THE OUTPUT INFORMATION TO THE USER COMPUTING DEVICE.
1408

RECEIVE A REPLY FROM THE USER TO THE AT LEAST ONE SUGGESTION IN RESPONSE TO INTERACTION BY THE USER WITH A USER INTERFACE PROVIDED BY THE USER COMPUTING DEVICE, THE COMPUTER-IMPLEMENTED METHOD OVERALL GUIDING THE USER TOWARDS A COMPLETION OF AN INFERRED TASK THROUGH A SUCCESSION OF SUGGESTIONS.
1410

FIG. 14

OVERVIEW OF THE OPERATION OF THE MULTI-TASK TRAINING FRAMEWORK 1502

GENERATE PLURAL GROUPS OF TRAINING EXAMPLES USING PLURAL EXAMPLE-GENERATING METHODS THAT DIFFER FROM EACH OTHER. FOR A FIRST GROUP OF TRAINING EXAMPLES, A TRAINING EXAMPLE PROVIDES A SEQUENCE OF QUERIES IN A SEARCH SESSION THAT HAVE BEEN DETERMINED TO EXHIBIT A COHERENT TASK-RELATED INTENT BY: USING A SECOND MACHINE-TRAINED MODEL TO IDENTIFY INTENTS ASSOCIATED WITH THE RESPECTIVE QUERIES; AND THEN DETERMINING RELATIONSHIPS AMONG THE INTENTS.
1504

GENERATE A FIRST MACHINE-TRAINED MODEL BY PERFORMING MULTI-TASK LEARNING BY INTERLEAVING EXAMPLES SELECTED FROM AMONG THE PLURAL GROUPS OF TRAINING EXAMPLES, THE FIRST MACHINE-TRAINED MODEL BEING USED DURING INFERENCE-STAGE PROCESSING TO MAP AT LEAST ONE QUERY SUBMITTED BY A USER INTO AT LEAST ONE SUGGESTION.
1506

FIG. 15

OVERVIEW OF THE OPERATION OF THE QUERY SEQUENCE-GENERATING SYSTEM 1602

RECEIVE AN INITIAL SET OF QUERIES SUBMITTED BY A USER IN A SEARCH SESSION WITHIN A PRESCRIBED AMOUNT OF TIME.
1604

REMOVE ONE OR MORE QUERIES IN THE INITIAL SET OF QUERIES THAT DO NOT SATISFY A QUERY RETENTION TEST, TO PROVIDE A NOISE-FILTERED SET OF QUERIES.
1606

USING A MULTI-TASK-TRAINED NEURAL NETWORK TO GUIDE INTERACTION WITH A QUERY-PROCESSING SYSTEM VIA USEFUL SUGGESTIONS

This application is a continuation of application Ser. No. 16/850,886, filed on Apr. 16, 2020, which is incorporated herein by reference in its entirety.

BACKGROUND

Search engines have traditionally responded to a user's query by providing a search results page that identifies a set of documents that most closely match the query. For instance, the search results page commonly provides a list of snippets that summarize the matching documents. The snippets also provide respective links to the documents. More recently, a search engine may also interrogate a knowledge graph based on the query to generate a direct answer to a question posed by the query. The search engine may provide that direct answer at the top of the search results page, along with its summary of the matching documents. A search results page may also commonly provide search suggestions to a user that guide the user in reformulating his or her query.

All of the above mechanisms improve a user's search experience. There is nevertheless room for improvement in this technological field. For instance, the search engine may serve suggestions that are broadly relevant to a user's topic of interest, but yet fail to meaningfully assist a user in conducting his or her search. Upon repeated observation of this behavior, a user may develop the habit of ignoring the suggestions. In some cases, the search engine's failure to provide helpful guidance may decrease the efficiency of a user's search session, e.g., by increasing the number of queries that a user enters to accomplish his or her search objective.

SUMMARY

A computer-implemented technique is described herein for assisting a user in interacting with a query-processing system. The technique uses a suggestion-generating system to provide one or more suggestions to a user in response to at least a last-submitted query provided by the user. The suggestion-generating system uses a first machine-trained model to perform this operation. The technique then generates output information that conveys the suggestion(s), and sends the output information to the user computing device. Each suggestion may take the form of a question that serves to advance a task that the user is presumed to be attempting to complete, e.g., by leading the user to a next part of the task, encouraging further exploration of a topic associated with the task, elaborating on a point in an answer given to the user, reframing the task, and so on. A succession of these kinds of suggestions can be said to govern or control a flow of interaction between the user and the query-processing system.

According to one aspect of the technique, the suggestion-generating system uses a classification-type neural network. In this case, the technique involves: generating an initial set of candidate suggestions based on the query; for each candidate suggestion, using the classification-type neural network to generate a ranking score that identifies an extent to which the candidate suggestion is appropriate for the query; and providing one or more candidate suggestions having respective top-ranked scores.

Alternatively, the suggestion-generating system uses a generative-type neural network that implements a language model. In this case, the technique involves using the generative-type neural network to serially generate tokens of a suggestion by serially processing tokens of a submitted query.

According to another illustrative aspect, a multi-task training framework generates the first machine-trained model used by the suggestion-generating system based on plural groups of training examples, which, in turn, are produced using different respective example-generating methods. The model produced thereby may therefore be referred to as a multi-task-trained model. One such example-generating method extracts a training example from a prior search session. The method uses an intent-generating component, which, in turn, uses a second machine-trained model, to identify the task-related intents of queries in the session. The example-generating method then identifies at least one sequence of queries in the search session that exhibits a coherent task-related intent. The queries in the identified sequence serve as a training example.

According to another aspect of the technique, the technique can identify a sequence of queries having a coherent task-related intent by forming one or more subgraphs of queries within the search session, with edges in the subgraphs connecting pairs of queries separated by no more than the prescribed distance in an intent-related vector space. The technique can then choose the subgraph having the greatest number of queries, and which satisfies other tests described herein.

Overall, the suggestions provided by the technique invite the user to enter productive queries that advance the task that the user is presumed to be performing. This allows the user to efficiently complete his or her task. For example, the suggestions may allow the user to complete his or her task with a fewer number of queries and less time, compared to the case in which the suggestions are not provided, e.g., by reducing the number of errant non-productive queries. The computing environment that hosts the technique also benefits, insofar as an efficient search session results in the efficient consumption of computing resources (e.g., processing, memory, storage, and communication resources).

The training framework uses a single process to train a single model. This makes the training framework more efficient than an alternative approach that trains plural single-task-trained models based on respective dedicated sets of training data. The training framework can also produce a more robust model compared to single-task-trained models; this is because the process of training on a diverse dataset is more challenging than the process of training based on a monolithic dataset, which leads to the production of a more nuanced and versatile model compared to a single-task-trained model.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 13 shows an example of the operation of the QSIS of FIG. 12.

FIG. 14 shows a process that provides an overview of the operation of the query-processing system of FIG. 1.

FIG. 15 shows a process that provides an overview of the operation of the training framework of FIG. 11.

FIGS. 16 and 17 together show a process that provides an overview of the operation of the QSIS of FIG. 12.

Figure 1:
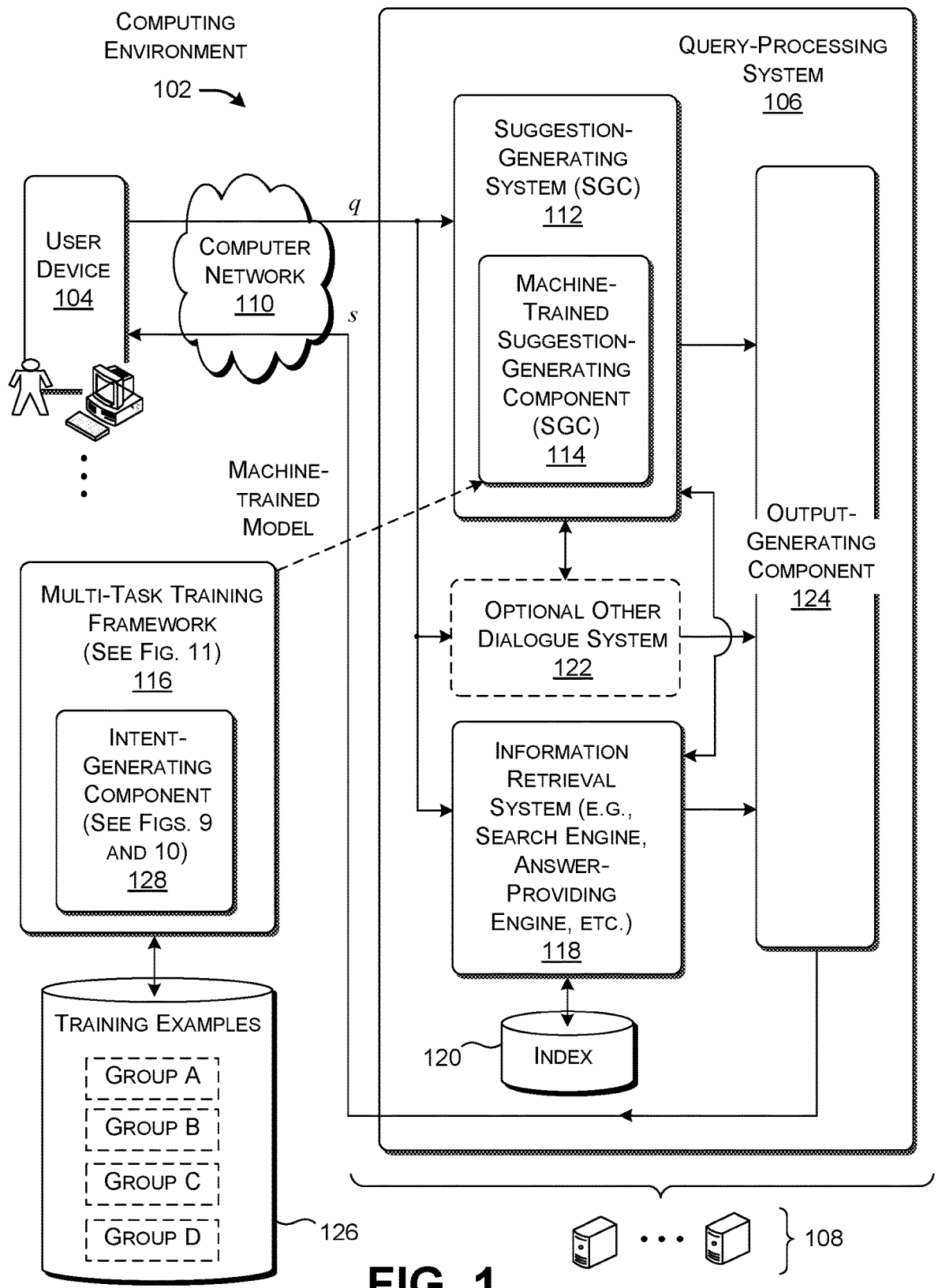
FIG. 1 shows an illustrative computing environment for providing suggestions to a user in response to a query submitted by the user.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented environment for providing helpful suggestions to a user that assist the user in advancing a task objective. Section B sets forth illustrative methods that explain the operation of the computing environment of Section A. And Section C describes illustrative computing functionality that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "engine," "system," and "tool" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further still, the descriptors "first," "second," "third," etc. are used to distinguish among different items, and do not imply an ordering among items, unless otherwise noted. Finally, the terms "exemplary" or "illustrative" refer to one implementation among potentially many implementations.

A. Illustrative Computing Environment

A.1. Overview

FIG. 1 shows illustrative computing environment 102 for providing suggestions to a user in response to a query (q) submitted by the user. To facilitate explanation, the computing environment 102 will be explained below in a search-related context. Here, a user submits the query with the intent of retrieving information regarding a topic of interest. The computing environment 102 responds by providing one or more suggestions. Each suggestion (s) may take the form of a question that the user is invited to submit as a next query (or as a replacement of a current query that the user has entered into an input box but has not formally executed). More generally, the computing environment 102 provides suggestions that help a user advance any task the user is presumed to be attempting to accomplish. For instance, in another case, the computing environment 102 may host a chatbot that provides advice to a user who is attempting to complete any task, such as installing or configuring a software application. Here, the computing environment 102 can generate suggestions that invite the user to take certain actions in furtherance of this objective.

The user may submit a query using a user computing device 104 of any type. Illustrative types of user computing devices include a desktop personal computing device, a handheld computing device of any type (such as a smartphone, a tablet-type computing device, etc.), a game console, a mixed-reality device, an Internet-of-Things (IoT) device, a wearable device, etc. FIG. 1 shows only a single user computing device 104, although it will be understood that the computing environment 102 will include plural user computing devices controlled by plural respective users.

A query-processing system 106 processes the user's query and provides one or more suggestions in response thereto. One or more servers 108 implement the query-processing system 106. The servers 108 may be located at a single site or distributed over plural sites. In this implementation, the user computing device 104 hosts a browser application through which the user may interact with a web site hosted by the query-processing system 106.

A computer network 110 communicatively couples each user computing device 104 with the query-processing system 106. The computer network 110 may include a wide area network (e.g., the Internet), a local area network, one or more point-to-point links, etc., or any combination thereof.

Alternatively, each user computing device 104 can locally implement at least part of the functionality attributed to the query-processing system 106 (described below). For example, the user computing device 104 can host a suggestion-generating system that replaces or works in conjunction with a server-side suggestion-generating system hosted by the query-processing system 106. To facilitate and simplify explanation, however, the following description will assume that the query-processing system 106 hosts all or most of the suggestion-generating functionality of the computing environment 102.

The query-processing system 106 includes a suggestion-generating system (SGS) 112 for generating at least one suggestion based on the last query that the user has submitted. Alternatively, the query-processing system 106 can generate at least one suggestion based on the last n queries that the user has submitted and/or based on other contextual information. The SGS 112 performs its operation using a suggestion-generating component (SGC) 114. As will be set forth below, the SGC 114 may correspond to a neural network, a statistical engine, or any other type of component that operates based on a machine-trained model. A machine-trained model, in turn, corresponds to a set of parameter values produced by a multi-task training framework ("training framework" for brevity) 116. Subsection A.2 provides additional details regarding the SGS 112, while Subsection A.4 provides additional details regarding one implementation of the training framework 116.

In a search-related context, the query-processing system 106 provides an information retrieval system 118. The information retrieval system 118 can include any type of search engine for identifying a set of documents that match the query submitted by the user. The search engine may work by generating a set of features that describe the input query, extracting a set of features that describe a candidate document, and generating a matching score that indicates an extent to which the features associated with the query match the features associated with the candidate document. The search engine can also take into consideration other contextual features, such as the current time of day, the location from which the search is being conducted, the characteristics of the user (if authorized by the user), and so on. The search engine can then identify a set of k candidate documents having the highest matching scores. An index 120 provides pre-generated information regarding the candidate documents, such as by providing a set of pre-generated features associated with each document. A crawler engine (not shown) can periodically or continuously interrogate a wide area network to discover the introduction and removal of documents that may be accessed by the search engine; in response thereto, the crawler engine updates the index 120.

In addition, or alternatively, the information retrieval system 118 can provide an answer-providing engine that provides a direct answer to a question posed by the user in his or her query. For instance, the answer-providing engine can provide a pre-generated knowledge graph. The answer-providing engine can use the query as a key to extract an answer from the knowledge graph, e.g., by using the features associated with the query to traverse the knowledge graph to find a node in the knowledge graph that provides an appropriate answer.

In addition, or alternatively, the query-processing system 106 can optionally include a dialogue system 122, such as a chatbot, that provides a conversational interface. In one implementation, the dialogue system 122 can include at least four principal parts. A first part includes an optional speech recognition component that receives an input signal from one or more audio input devices (not shown). The speech recognition component converts the input signal into recognized speech information, e.g., using a deep neural network (DNN) of any type. In an alternative case, the dialogue system 122 receives the user's messages in text form, making the conversion of speech signals to text unnecessary.

A second part includes a language understanding (LU) component that optionally uses one or more analysis components to interpret the user's input message. In response to this analysis, the LU component outputs an interpreted user message. In one non-limiting implementation, the LU component includes at least one domain determination component, at least one intent determination component, and at least one slot value determination component. The optional domain determination component determines the most probable domain associated with the input message. A domain pertains to the general theme to which an input message pertains, which may correspond to a set of tasks handled by a particular application, or a subset of those tasks. For example, the command "find Mission Impossible" pertains to a media search domain. The intent determination component determines an intent associated with the input message. An intent corresponds to an objective that a user likely wishes to accomplish by submitting an input message. For example, a user who submits the command "find Mission Impossible" intends to find a particular movie having the name of "Mission Impossible." The slot value determination component determines slot values in the input message. The slot values correspond to information items that an application needs to perform a requested task, upon interpretation of the input message. For example, the command, "find Jack Nicolson movies in the comedy genre" includes a slot value "Jack Nicolson" that identifies an actor having the name of "Jack Nicolson," and a slot value "comedy," corresponding to a requested genre of movies. Any of the domain determination component, intent determination component, and slot value determination component can use any technology to perform their respective functions. For example, any of these components can use one or more machine-trained models, rules-based engines, etc.

A third part of the dialogue system 122 includes a dialogue management component. This element uses one or more analysis components to track the state of the ongoing conversation and to map the interpreted input message provided by the LU component into a dialogue system response. In one implementation, the dialogue management component can use a machine-learned model to perform its mapping operation. Alternatively, or in addition, the dialogue management component can use a rules-based engine to perform its mapping operation. Alternatively, or in addition, the dialogue management component can generate the dialogue system response based on one or more dialogue script templates provided in a data store.

A fourth part of the dialogue system provides a response conversion component that converts the dialogue system response provided by the dialogue management component into an appropriate output form for consumption by the user. The response conversion component can perform the above task using a lookup table, a generative machine-trained model, etc., or any combination thereof.

The search engine, answer-providing engine, and dialogue system 122 can work in conjunction with the SGS 112 in different environment-specific ways. For example, the search engine and answer-providing engine can use the SGS 112 to supplement the output results that they generate. The dialogue system 122 can use the SGS 112 for assistance in generating a reply to a user's input message.

In some implementations, an output-generating component 124 generates output information that conveys the results of the SGS 112, search engine, answer-providing engine, etc. The output-generating component 124 then sends the output information to the user computing device 104 for presentation thereat. In one implementation, the output-generating component 124 formulates the output information into one or more search results pages.

Figure 2:
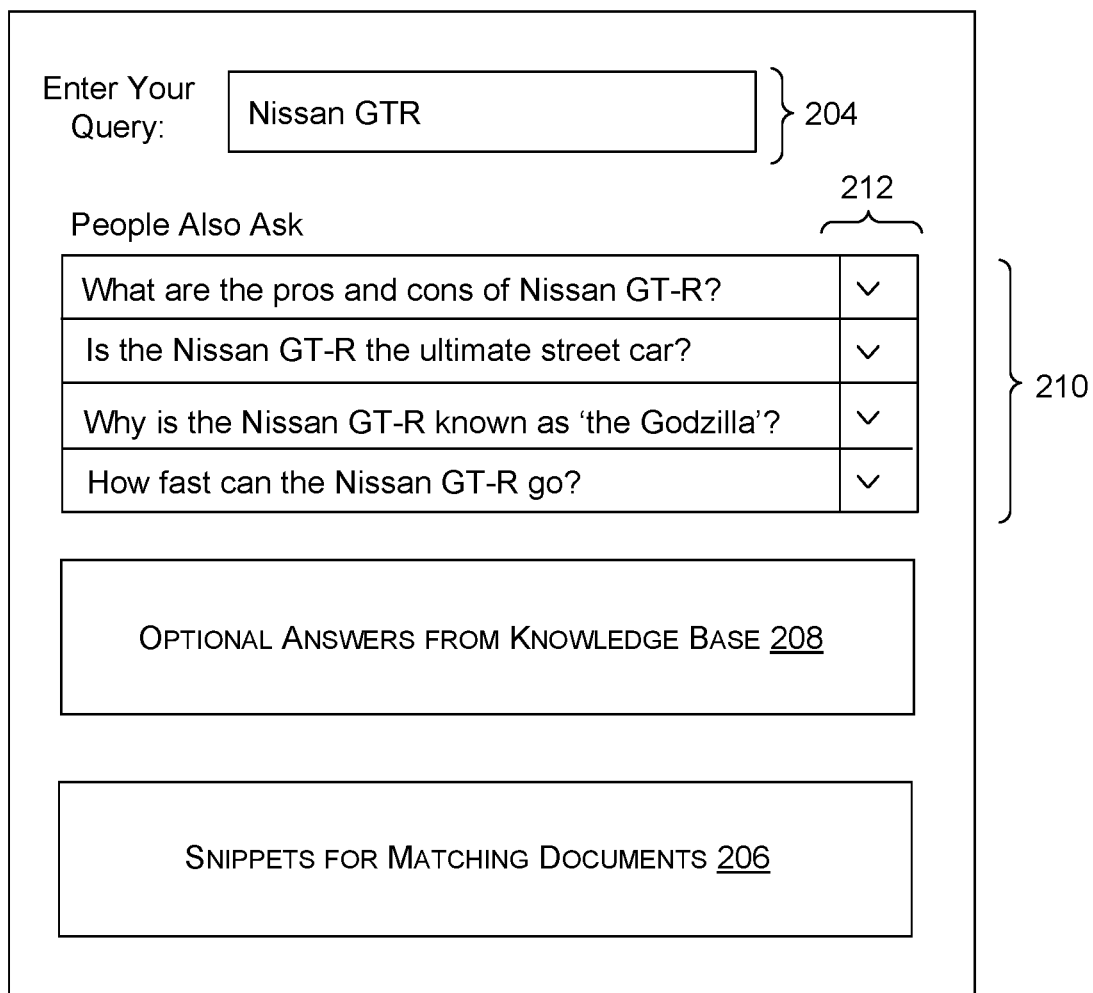
FIG. 2 shows search results page provided by a query-processing system in the computing environment of FIG. 1.

Jumping ahead momentarily in the series of figures, FIG. 2 shows an illustrative search results page 202 that may be provided by the output-generating component 124. A browser application provided by the user computing device 104 can present this page 202 to the user. In this merely illustrative case, the search results page 202 includes an input box 204 for receiving the user's input query (here, the query "Nissan GTR"). Assume that the user has formally submitted the query at this time. In response, the search engine provided by the query-processing system 106 generates a set of documents that match the query. The output-generating component 124 generates a set of snippets associated with those documents and displays those snippets in another section 206 of the search results page 202. Optionally, the answer-providing engine may provide a direct answer to any question posed in the user's query. If so, the output-generating component 124 can provide the answer in another section 208 of the search results page 202.

The search results page 202 includes yet another section 210 that presents four suggestions provided by the SGS 112. The suggestions take the form of questions. More specifically, in one example, the output-generating component 124 presents the suggestions immediately after the user types the input query "Nissan GTR," possibly prior to the user formally submitting the query by activating an "enter" key. In another case, the output-generating component 124 generates the suggestions only after the user formally submits the query. The suggestions also include respective control elements 212 that allow the user to select the respective questions. The user may interact with the search results page 202 to select a question via its control element. This causes the browser application running on the user computing device 104 to submit the question to the query-processing system 106 as a next query.

Returning to FIG. 1, the training framework 116 produces the machine-trained model used by the SGC 114 by performing machine training based on plural groups of training examples. As will be more fully described below in Subsection A.4, the training framework 116 produces the plural sets of training examples using different respective example-generating methods. A data store 126 stores the plural groups of training examples. In some cases, a positive training example includes a pairing of a query and a suggestion that is deemed appropriate for the query. The training framework 116 can interleave batches pulled from different groups of training examples in the course of its iterative generation of the machine-trained model.

At least one example-generating method uses an intent-generating component 128. Subsection A.3 will provide details regarding one implementation of the intent-generating component 128. By way of overview, the intent-generating component 128 uses another machine-trained model to map a query into an intent vector. The intent vector represents the user's likely intent in submitting the query, expressed with reference to possible intents defined by an intent-related vector space. In other words, the intent vector provides a distributed representation of an objective that the user is likely attempting to accomplish in submitting the query.

Note that the intent-generating component 128 produces output vectors that do not necessarily agree with semantic vectors produced by a semantic-based embedding mechanism. Consider the example in which a user submits an input query "Apartments for rent in Cambridge 2020 this fall" with the intent of finding an apartment for an upcoming fall semester in the Boston metropolitan region. A semantic-based embedding mechanism may identify this query as semantically related to the query "Need apartment in Ithaca for fall 2020." But the user who submits the query "Apartments for rent Cambridge 2020 this fall" is interested in finding an apartment in Cambridge, Massachusetts, not Ithaca, New York. Hence, the intent-generating component 128 may indicate that the two above queries are farther part in its native intent-related vector space, compared to the distance between the two queries in a semantic-related vector space. Yet the intent-generating component 128 can also incidentally provide results that reveal information about the semantic relationship between queries, insofar as two queries that share the same intent often have similar semantic characteristics.

As will be described in Subsection A.4, the training framework 116 leverages the intent-generating component 128 to find sequences of queries within search sessions that exhibit coherent or consistent intents. It uses the queries associated with each such sequence to compose a training example. More specifically, a positive training example in this case includes a pairing that includes, as a first member, the queries in the sequence preceding the last-submitted query in the sequence, and, as a second member, the last-submitted query in the sequence.

Figure 3:
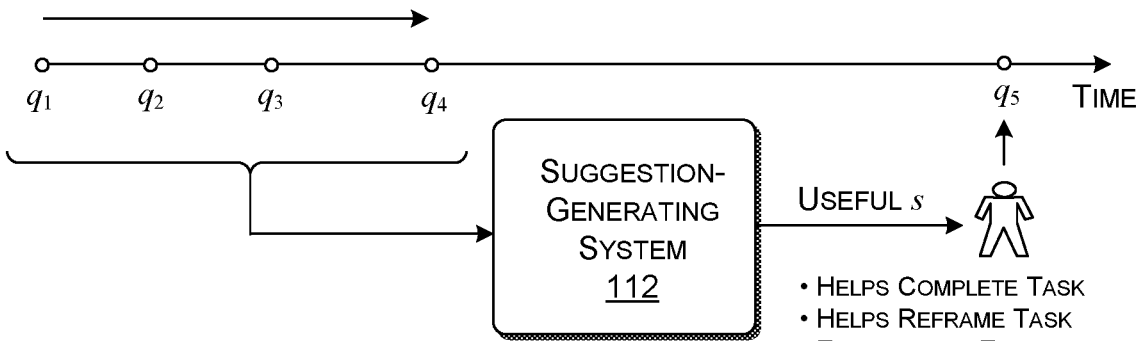
FIG. 3 provides an overview of a strategy employed by the query-processing system of FIG. 1 to generate queries.

FIG. 3 provides a high-level overview of a strategy employed by the query-processing system 106 of FIG. 1 in generating queries. Assume that, at a present point in time, the user has already submitted four queries ($q_1$, $q_2$, $q_3$, $q_4$) in a temporal sequence, making the query $q_4$ the last-submitted query. The SGS 112 produces a set of suggestions in this case that are aimed at assisting the user in advancing a search objective that the user is presumed to be attempting to accomplish. More colloquially and generally stated, the SGS 112 attempts to provide useful suggestions to the user. The SGS 112 accomplishes this objective by relying on the machine-trained model produced by the training framework 116. The model extracts insight into an emerging intent 302 exhibited by the user's search-related behavior thus far, as reflected in the four submitted queries. The SGS 112 also attempts to find suggestions that match or otherwise complement the emerging intent 302. The model also captures and is informed by the behavioral patterns exhibited by many previous users, with respect to their section of suggestions after submitting queries.

In some cases, a useful suggestion helps a user move on to a next part of a task that he or she is attempting to accomplish. Alternatively, or in addition, a useful suggestion assists the user in reframing the task that he or she is attempting to accomplish, e.g., by including terminology that casts the task from another perspective than heretofore expressed. Alternatively, or in addition, a useful suggestion points the way to further exploration of a topic associated with the task, thereby encouraging further exploration. Alternatively, or in addition, a useful suggestion elaborates on an answer that the answer-providing engine has provided in the section 208 of the search results page 202. These hallmarks of usefulness are cited by way of illustration, not limitation; suggestions can be deemed useful for yet other reasons.

What constitutes a useful suggestion may also be clarified by describing categories of queries that are considered unhelpful. Some suggestions may be considered unhelpful because they ask for information that the user is presumed to already possess. The knowledge that the user already possesses can be inferred, in part, based on the information explicitly or implicitly conveyed by the queries submitted by the user. Other suggestions may be considered unhelpful because they ask for information that it too narrow in scope, in view of the generality with which the user has expressed his or her queries. Other suggestions may be considered redundant because they express information that is likely already provided in the answers provided by the answer-providing engine, and presented in the section 208. Other suggestions may be considered unhelpful because they do not match the emerging intent 302 of the search session. These categories of unhelpful queries are not mutually exclusive; a suggestion may be considered to be not useful for two or more of the reasons set forth above.

In the example of FIG. 2, recall that the user entered the query "Nissan GTR." A question "What are the pros and cons of Nissan GT-R" might be considered useful based on the assumption that the user is interested in purchasing a car of this make and model, and wishes to consider the pros and cons of such a purchase. A suggestion "What is Nissan GTR" might not be useful because the user who submitted the query likely already knows that a Nissan GTR is a car, and probably is aware that it is a sports car. In addition, or alternatively, this information likely duplicates an answer provided by the answer-generating engine in the section 208. The question "How to buy used Nissan GTR in Pittsburgh" is likely too specific because there is no evidence that this particular user wants to purchase this particular car in the particular city of Pittsburgh. The query "Is Nissan Leaf a good car?" is likely not useful because the user has shown no intent to purchase another car by the manufacturer Nissan, particularly a car that might be considered an antipode of the Nissan GTR (the Nissan Leaf being an energy-efficient economy vehicle).

By virtue of providing helpful suggestions, the computing environment 102 of FIG. 1 can allow a user to complete his or her search in an efficient manner. For instance, by virtue of providing helpful suggestions, the computing environment 102 can reduce the number of queries that the user needs to submit to accomplish his or her search objective (relative to the case in which the SGS 112 is not used). This reduces the burden on the user, saves time, and reduces the expenditure of computing resources (including processing, memory, storage, and communication resources). The SGS 112 more generally provides good user experience, which is one factor that may encourage a user to continue to use the query-processing system 106. Stated in other words, by providing helpful suggestions, the computing environment 102 reduces the probability that the user will submit unproductive queries. By eliminating an unproductive query, the user saves time, and the computing environment 102 does not expend the resources that would otherwise be applied to process the query.

The query-processing system 106, in performing the above operations, serves as a guidance or control system. The guidance system detects an evolving intent associated with a user's search session and, simultaneously therewith, provides suggestions to the user that help efficiently direct the user towards the satisfaction of whatever objective is currently presumed to underlie the search session.

Further note that, by virtue of the use of the SGS 112, the query-processing system 106 can engage the user in a conversational experience, but within the structured context of a user interface provided by a search engine. That is, the query-processing system 106 continues to allow a user to submit queries to the search engine in a traditional manner, e.g., by typing the queries into an input box of a user interface presentation. But unlike a traditional search engine, the SGS 112 applies a machine-trained model that captures a rich understanding of the objective that the user is attempting to accomplish in a session. This allows the SGS 112 to effectively guide the user in such a manner to advance the objective. In so doing, the exchange of information between the user and the query-processing system 112 begins to resemble the character of a conversation, but again, all within the structured framework of a search results page. The user may be comfortable engaging the query-processing system 106 via this path because the user is already familiar with the principal user interface elements of a search results page.

A.2. The Suggestion-Generating System

Figure 4:
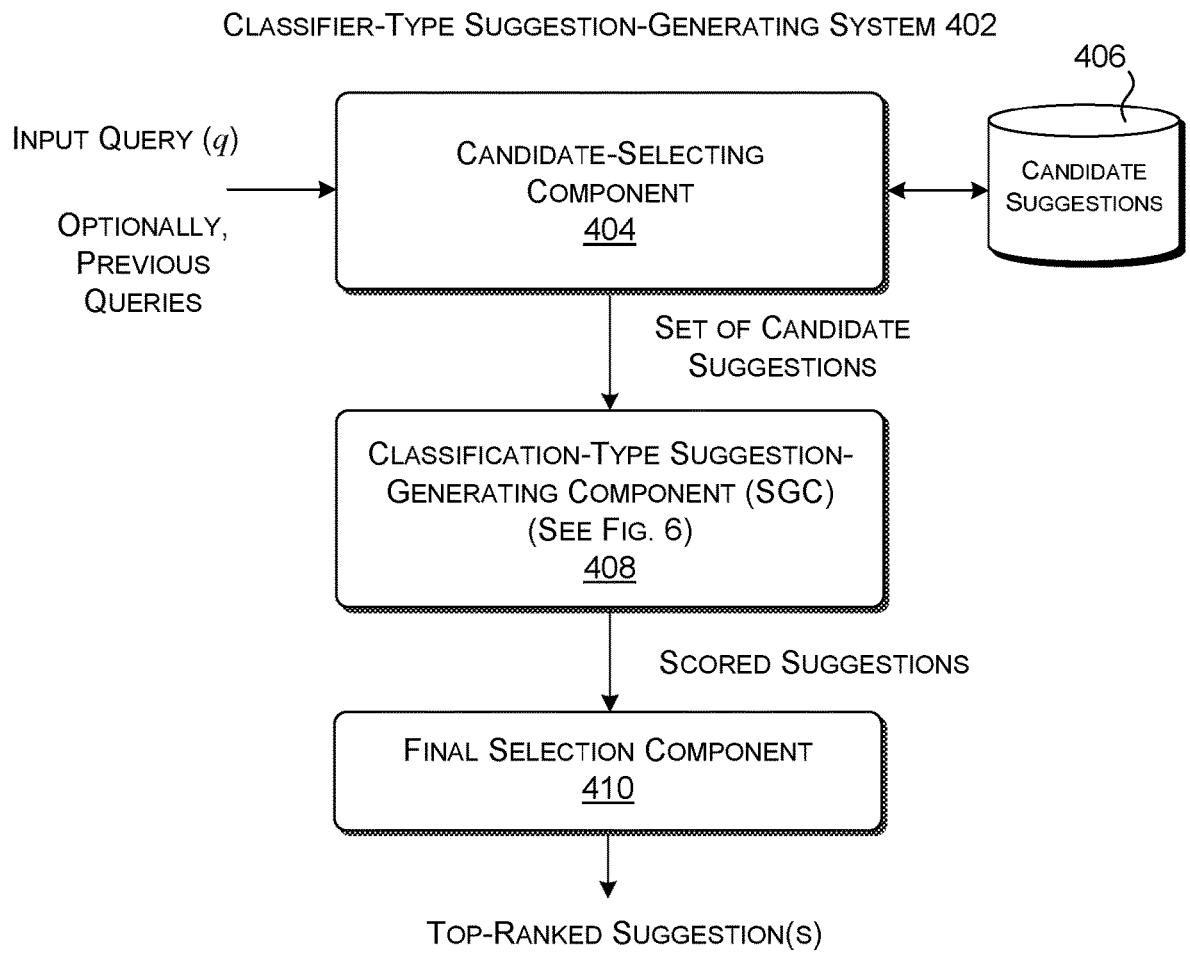
FIG. 4 provides an overview of a classification-type suggestion-generating system (SGS) used by the query-processing system of FIG. 1.
Figure 5:
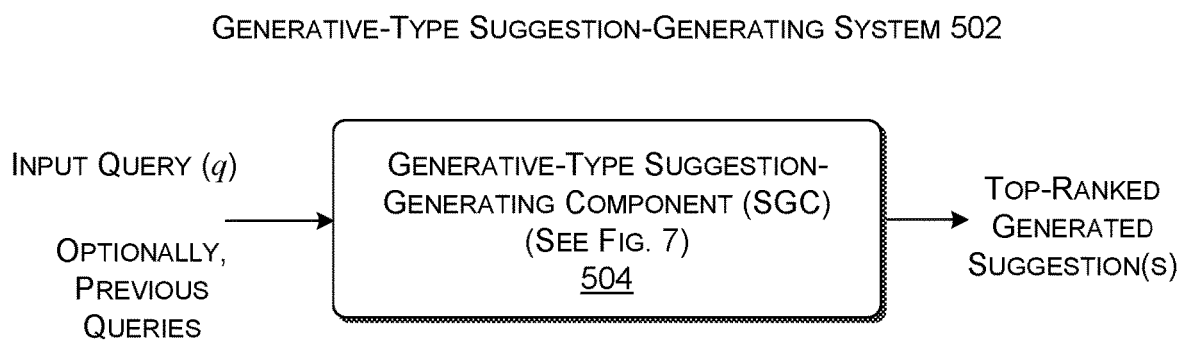
FIG. 5 provides an overview of a generative-type suggestion-generating system (SGS) used by the query-processing system of FIG. 1.

FIGS. 4 and 5 provide two version-specific implementations of the suggestion-generating system (SGS) 112 of FIG. 1. Starting with FIG. 4, this figure provides an overview of a classification-type suggestion-generating system (SGS) 402. The classification-type SGS 402 performs analysis to select an appropriate set of suggestions from a larger corpus of candidate suggestions. Here, the candidate suggestions exist prior to the user submitting the query(ies).

More specifically, an optional candidate-selecting component 404 provides an initial set of candidate suggestions, selected from a more encompassing set of candidate suggestions in a data store 406. The candidate suggestions in the data store 406 may include actual queries submitted to the search engine by users on previous occasions. The search engine may store these queries in a historical query log. Alternatively, or in addition, the candidate suggestions in the data store 406 may include questions derived from titles of documents and/or other passages in the documents. Alternatively, or in addition, the candidate suggestions in the data store 406 can include synthetic suggestions (e.g., produced by a generative machine-trained model) and/or manually-created suggestions, and so on. This preparatory processing can also produce an answer to each question, such that the answer-providing engine can provide an appropriate answer if a user selects the question.

The candidate-selecting component 404 can use any strategy to select the initial set of candidate suggestions given a user's input query. For example, the candidate-selecting component 404 can use a similar algorithm to the above-described search engine to match an input query (or queries) against the candidate suggestions, to select a set of candidate suggestions that are appropriate for the input query. It can perform this comparison based on any combination lexical features, semantic features, click-behavior features, contextual features, etc. Alternatively, or in addition, the candidate-selecting component 404 can consult a pre-generated linking mechanism (such as a table, graph, etc.) that identifies a relation between the input query and an appropriate set of candidate suggestions. In an alternative implementation, the classification-type SGS 402 can omit the candidate-selecting component 404. Here, the classification-type SGS 402 treats the entire corpus of candidate suggestions in the data store 406 as the initial set of candidate suggestions to be compared with the input query(ies).

A classification-type suggestion-generating component (SGC) 408 is the classification-type version of the SGC 114 shown in FIG. 1. The classification-type SGC 408 receives input information that identifies the input query (or queries) and a candidate suggestion under consideration. It generates a ranking score that identifies an extent to which the candidate suggestion is considered an appropriate choice for the query(ies). A final selection component 410 selects a final set of k suggestions based on the ranking scores associated with those candidate suggestions, optionally together with other ranking features. For example, the final selection component 410 can select the four candidate suggestions having the most favorable ranking scores.

FIG. 5 provides an overview of a generative-type suggestion-generating system (SGS) 502. This type of SGS 502 includes a generative-type SGC 504 which is the generative-type version of the SGC 114 shown in FIG. 1. The generative-type SGC 114 operates by synthetizing at least one suggestion s given the input query (or queries). Here, the suggestion that the generative-type SGC 504 provides does not necessarily exist prior to its generation. Colloquially speaking, the generative-type SGC 504 generates the suggestions from "scratch", although it is also informed by the training examples that were used to train it, which are reflected in its parameter values. The generative-type SGS 502 is potentially more efficient compared to the classification-type SGS 402 because it eliminates the resource-intensive task of generating candidate suggestions and choosing an initial set of candidate suggestions (e.g., as performed by the candidate-selecting component 404).

Figure 6:
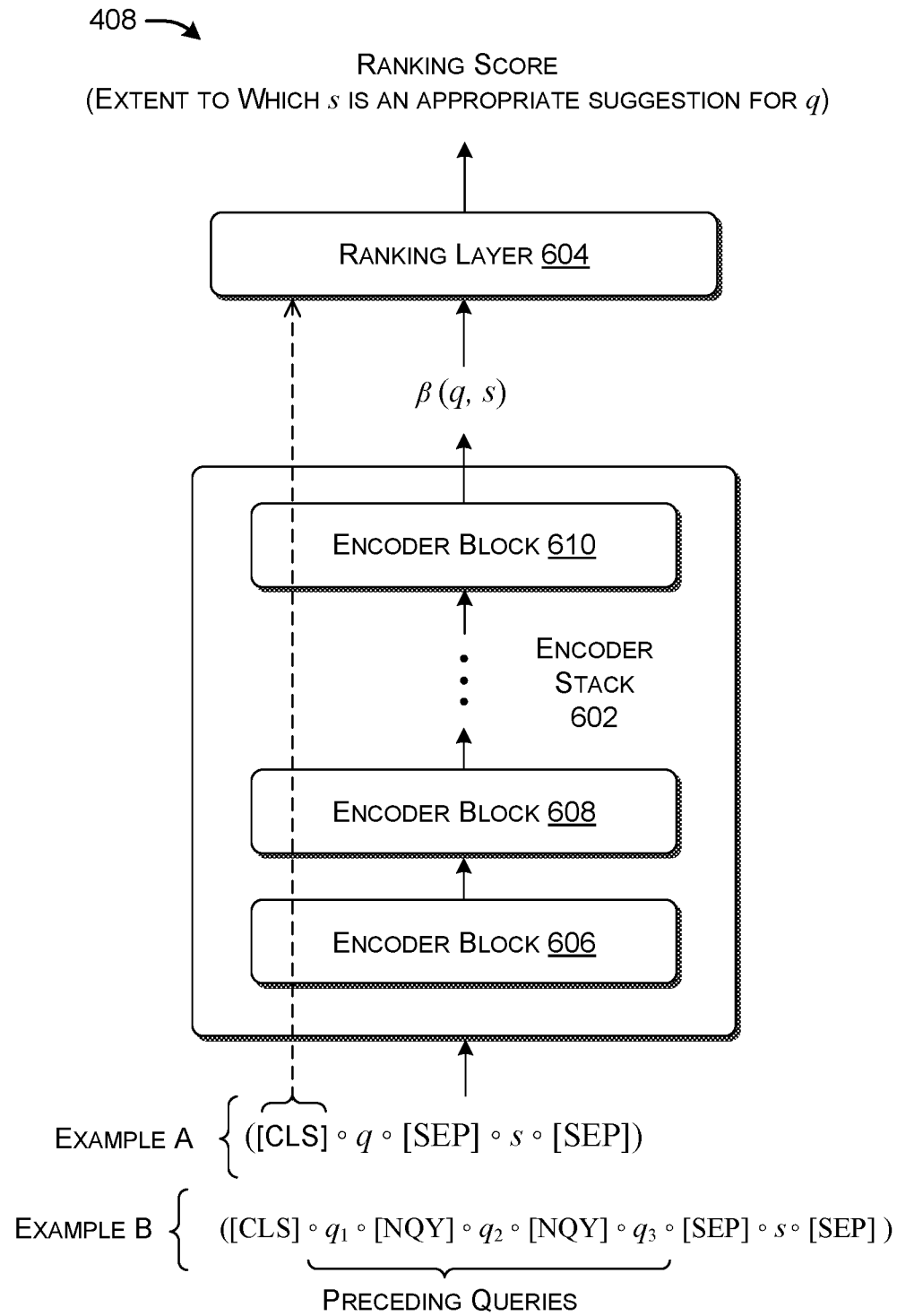
FIG. 6 show one type of classification-type suggestion-generating component (SGC) for use in the classification-type SGS of FIG. 4.

FIG. 6 shows a simplified view of one implementation of the classification-type SGC 408 introduced in FIG. 4. The classification-type SGC 408 is a neural network that includes an encoder stack 602 and a ranking layer 604. The encoder stack 602 is implemented as a transformer-based neural network that includes a pipeline of encoder blocks (606, 608, . . . , 610). Background literature on the general topic of transformer-based neural networks can be found in Vaswani, et al., "Attention Is All You Need," arXiv reprint, arXiv:1706.03762v5 [cs.CL], Dec. 6, 2017, 15 pages. Background literature on the general topic of pre-trained networks that may be built using transformer-based neural networks can be found in Devlin, et al., "BERT: Pre-training of Deep Bidirectional Transformers for Language Understanding," arXiv reprint, arXiv:1810.04805v2 [cs.CL], May 24, 2019, 16 pages. But the use of transformer-based neural networks is cited merely by way of example, not limitation; other classification-type SGCs can be built using convolutional neural networks (CNNs), recurrent neural networks (RNNs), and so on. Alternatively, or in addition, other classification-type SGCs can be built using machine-trained models that are not considered neural networks.

The encoder stack 602 can accept input information in at least two forms. A first case (Example A) involves the case in which the classification-type SGS 402 is assigned the task of comparing a single input query q with a candidate suggestion s. The SGS 408 can formulate the input information by concatenating the following tokens in order: a classification token [CLS]; one or more tokens that represent the input query q; a separation token [SEP]; one or more tokens that represent the candidate suggestion s; and another separation token [SEP]. The encoder stack 602 transforms the classification token [CLS] into an encoded counterpart, which it provides in a final layer of the encoder stack 602. As will be described below, the ranking layer 604 can use the encoded counterpart of the token [CLS] to classify the input information. The first [SEP] token marks the separation between the query and the candidate suggestion. The last [SEP] token designates the end of the input information. The symbol ○ denotes concatenation. As will be appreciated, this selection and arrangement of tokens is described merely by way of illustration, not limitation; other implementations can encode the input information using a different selection of token types and/or a different arrangement of tokens.

A second case (Example B) involves the case in which the classification-type SGS 402 is assigned the task of determining whether a candidate suggestion is an appropriate choice given plural preceding queries ($q_1$, $q_2$, $q_3$). This example is the same as the first example, except that the input information concatenates the plural preceding queries. A special token [NQY] separates pairs of temporally adjacent queries. Again, the selection and arrangement of tokens in the second example is to be understood as being presented in the spirit of illustration, not limitation.

For the first example (Example A), the encoded counterpart of the [CLS] token provides a representation $\beta(q,s)$ that expresses a relationship between the query q and the suggestion s. In one implementation, the ranking layer 604 may provide a linear transformation of the representation, to produce a final ranking score. In other implementations, the ranking layer 604 can apply any type of transformation to any part(s) of the output information generated by the final layer of the encoder stack 602, e.g., by mapping the entirety of the output information into the final ranking score.

Figure 7:
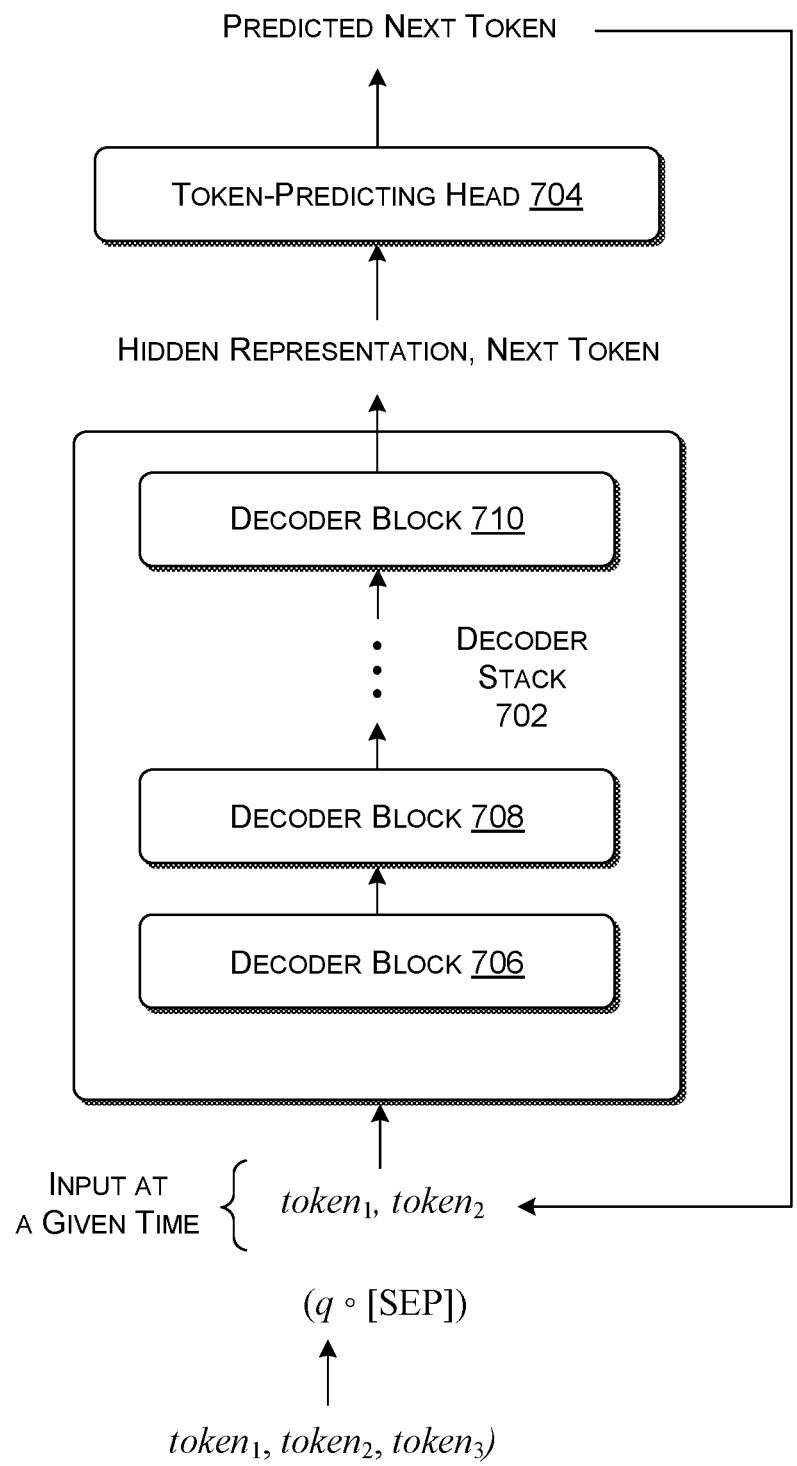
FIG. 7 shows one type of generative-type suggestion-generating component (SGC) for use in the generative-type SGS of FIG. 5.

FIG. 7 shows a simplified view of one implementation of the generative-type SGC 504 introduced in FIG. 5. The generative-type SGC 504 provides a language model implemented as a neural network. It includes a decoder stack 702 and token-predicting head 704. The decoder stack 702 is implemented as a transformer-based neural network that includes a pipeline of decoder blocks (706, 708, . . . , 710). Again, the use of a transformer-based neural network is cited merely by way of example, not limitation. Other classification-type SGCs can be built using other types of language models, including other types of neural networks and/or other types of statistical engines (that are not necessarily neural networks). For example, the generative-type SGC 504 could alternatively be build using a sequence-to-sequence neural network, e.g., composed of a recurrent series of long short-term memory (LSTM) neural network units or gated recurrent units (GRUs).

In the example shown in FIG. 7, the merely illustrative input query q includes three tokens (token$_1$, token$_2$, token$_3$), such as three words. The generative-type SGC 504 processes the input query q in serial fashion, token by token. At each stage, the generative-type SGC 504 attempts to predict the next token(s) that will follow the tokens that have been input to the SGC 504 thus far. The generative-type SGC 504 terminates it processing for the input query when it generates an end-of-sequence [EOS] token, indicating that a complete candidate suggestion has been generated.

More specifically, the final layer of the decoder stack 702 will generate a hidden representation h. The token-predicting head 704 maps this hidden representation into a prediction of a most likely next token, given a set of tokens encountered so far. After each prediction, the SGS 502 will update the input information fed to the SGC 504 to include the next token predicted by the SGC 504. However, the SGS 502 will use an actual next token, not the predicted token, if the actual next token has already been specified in the query under consideration. For example, given the first two tokens of the input query, the generative-type SGC 504 will predict the third token. In the next iteration of processing, however, the SGS 502 updates the input information to include the actual third token of the input query, even if it disagrees with the predicted token. After processing the tokens in the input query, the generative-type SGS 502 will generate a candidate suggestion in token-by token-fashion. In another implementation (not shown), the generative-type SGS 502 can generate all of the tokens of a suggestion at the same time.

Figure 8:
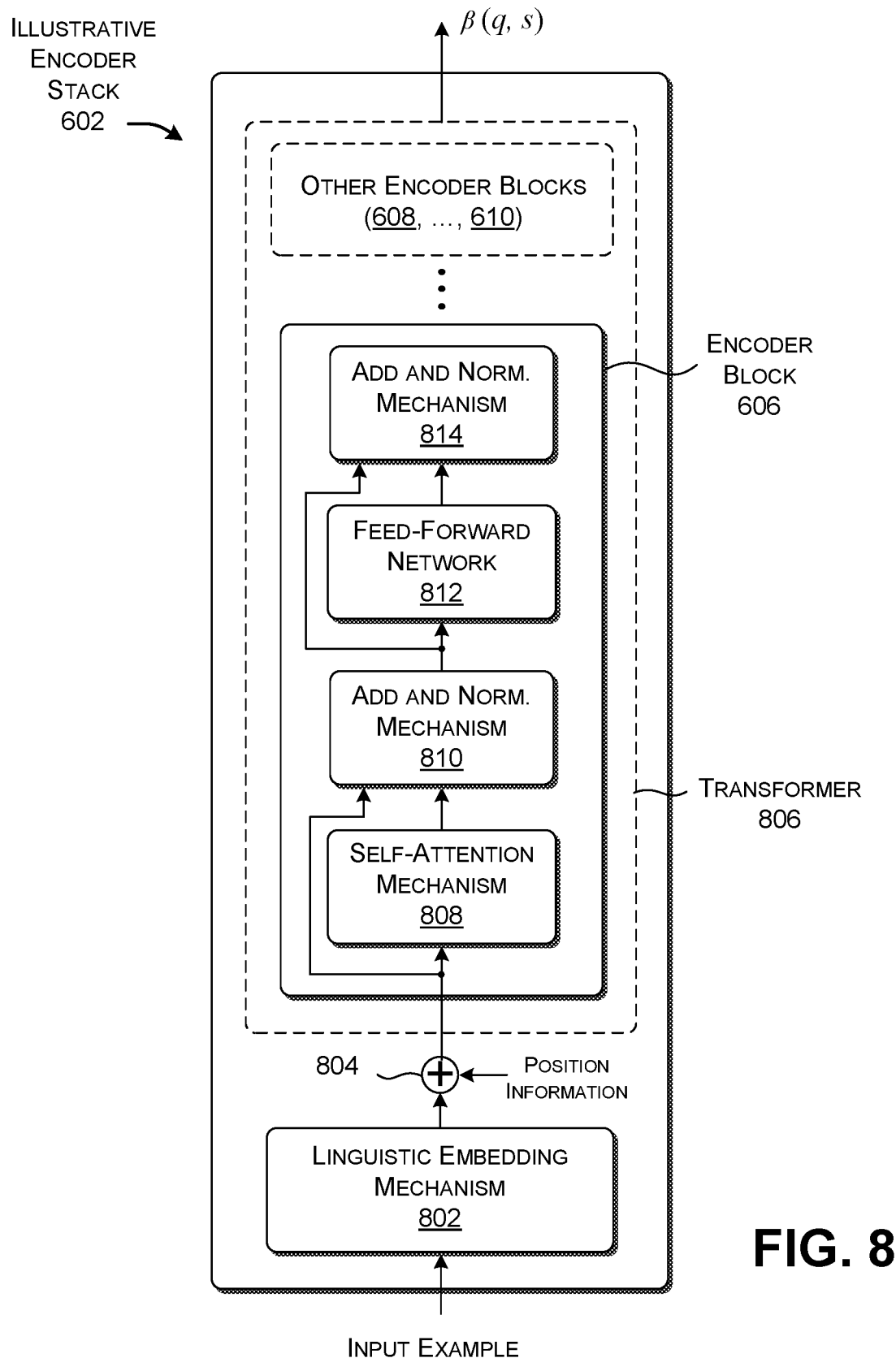
FIG. 8 shows one implementation of a transformer-based encoder stack used by the classification-type SGC of FIG. 6.

FIG. 8 shows one implementation of the transformer-based encoder stack 602 provided by the classification-type SGC 408 of FIG. 6. Starting at the bottom of this figure, a linguistic embedding mechanism 802 transforms the tokens in the input information into a set of input embeddings, also referred to herein as input vectors. The linguistic embedding mechanism 802 can use different techniques to perform this task. In one approach, the linguistic embedding mechanism 802 can convert each word in input information into a vector representation, e.g., using a lookup table, neural network, etc.

Next, an adding mechanism 804 adds position information to each input embedding. The position information describes the position of a token (associated with a particular input embedding) in the series of tokens that make up the input information. For example, assume that the input information includes the query "hybrid Ford hatchback 2020." The adding mechanism 804 will add position information to the input embedding associated with "hybrid" that indicates that the word "hybrid" is the first token in the query. Overall, the encoder stack 602 adds position information to the input embeddings to inform its self-attention mechanisms (described below) of the positional context of each token under consideration within the input information. The adding mechanism 804 can encode position information in different ways, such as by using one or more sinusoidal functions to map the index of a token into position information, or by using a machine-trained function to map the index of the token into position information. Overall, the adding mechanism 804 produces position-modified embeddings.

A transformer 806 next maps the set of position-modified embeddings into transformer output vectors. The transformer 806, in turn, includes a chain of one or more encoder blocks, including a representative encoder block 606 and one or more other encoder bocks (608, . . . , 610). The representative encoder block 606 includes a series of layers, including a self-attention mechanism 808, an add-and-normalize mechanism 810, a feed-forward neural network 812, and another add-and-normalize mechanism 814.

The self-attention mechanism 808 determines the significance of each token in the input information with respect to each other token. For example, assume that a query reads "What is the median sales price of this product in the city of Billings, MT?" In processing the word "Billings," the self-attention mechanism 808 may determine that the tokens "city" and "MT" are most useful in correctly disambiguating the term "Billing," e.g., because these contextual terms strongly suggest that "Billings" refers to a physical place rather than a financial term.

The self-attention mechanism 808 can determine the above-described cross-term relevance by packing the position-modified embeddings into a single matrix X. The self-attention mechanism 808 then linearly projects this matrix X into three matrices Q, K, V, corresponding to a query matrix, key matrix, and value matrix, respectively, where $d_k$ is the dimension of the queries and keys in Q and K, respectively. A dot-product mechanism computes attention based on the equation:

$$\text{Attention } (Q, K, V) = \text{softmax}\left(\frac{QK^T}{\sqrt{d_k}}\right)V. \qquad (1)$$

For the case of a multi-head attention mechanism, not shown, the self-attention mechanism 808 can repeat the above analysis for different subspaces, e.g., by creating three different sets of the Q, K, and V matrices associated with three different respective subspaces, and repeating the calculation above for each subspace.

The add-and-normalize mechanism 810 adds the input to the self-attention mechanism 808 (i.e., the position-modified input embeddings) to the output result of the self-attention mechanism 808, and then performs layer-normalization on that sum. The feed-forward network 812 uses a fully-connected (FC) feed-forward neural network having any number of layers to transform the output of the add-and-normalize mechanism 810 into an output result. In one implementation, the feed-forward network 812 can use linear transformations interspersed with activations (e.g., ReLU activations). The last add-and-normalize mechanism 814 adds the input that is fed to feed-forward network 812 to the output result of the feed-forward network 812, and then layer-normalizes that sum.

Although not shown, the decoder stack 702 of FIG. 7 can use a similar transformer architecture to that presented in FIG. 8. One exception is that a decoder block uses masked self-attention. Masked self-attention operates to block consideration of tokens of the input information that are not yet being fed into the decoder stack 702 at a given time. In the example of FIG. 7, the masked self-attention would block consideration of the third token $token_3$.

A.3. The Intent-Generating Component

Recall from Subsection A.1 that the training framework 116, as part of its training-stage processing, uses the intent-generating component 128 to generate intent vectors associated with respective queries in a search session. Each intent vector represents the presumed intent underlying a query, expressed with reference to an intent vector space. More generally stated, the intent captures insight regarding the task that the user is attempting to accomplish by submitting the query.

Figure 9:
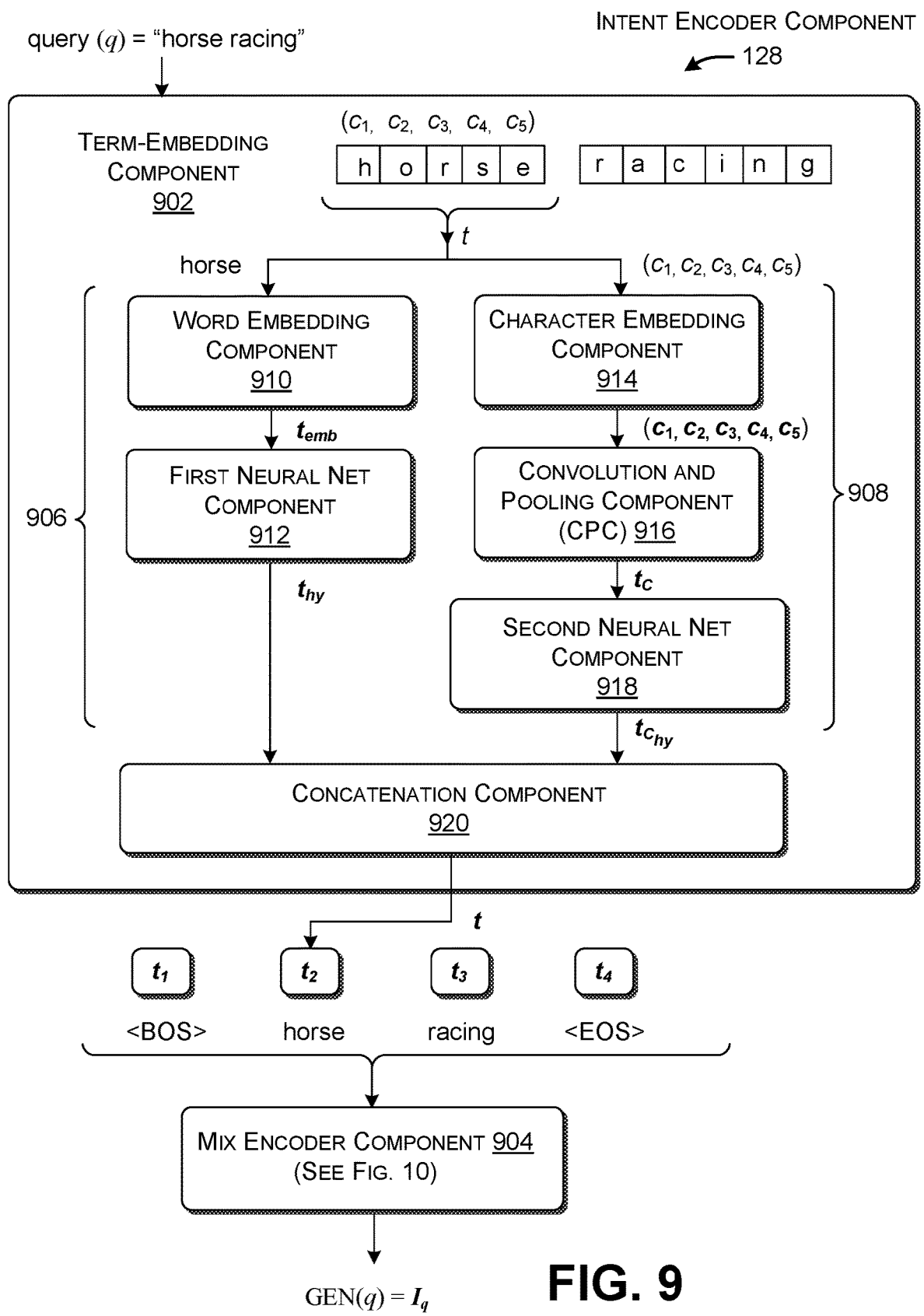
FIGS. 9 and 10 together show one implementation of an intent-generating component used to identify task-related intents of queries.
Figure 10:
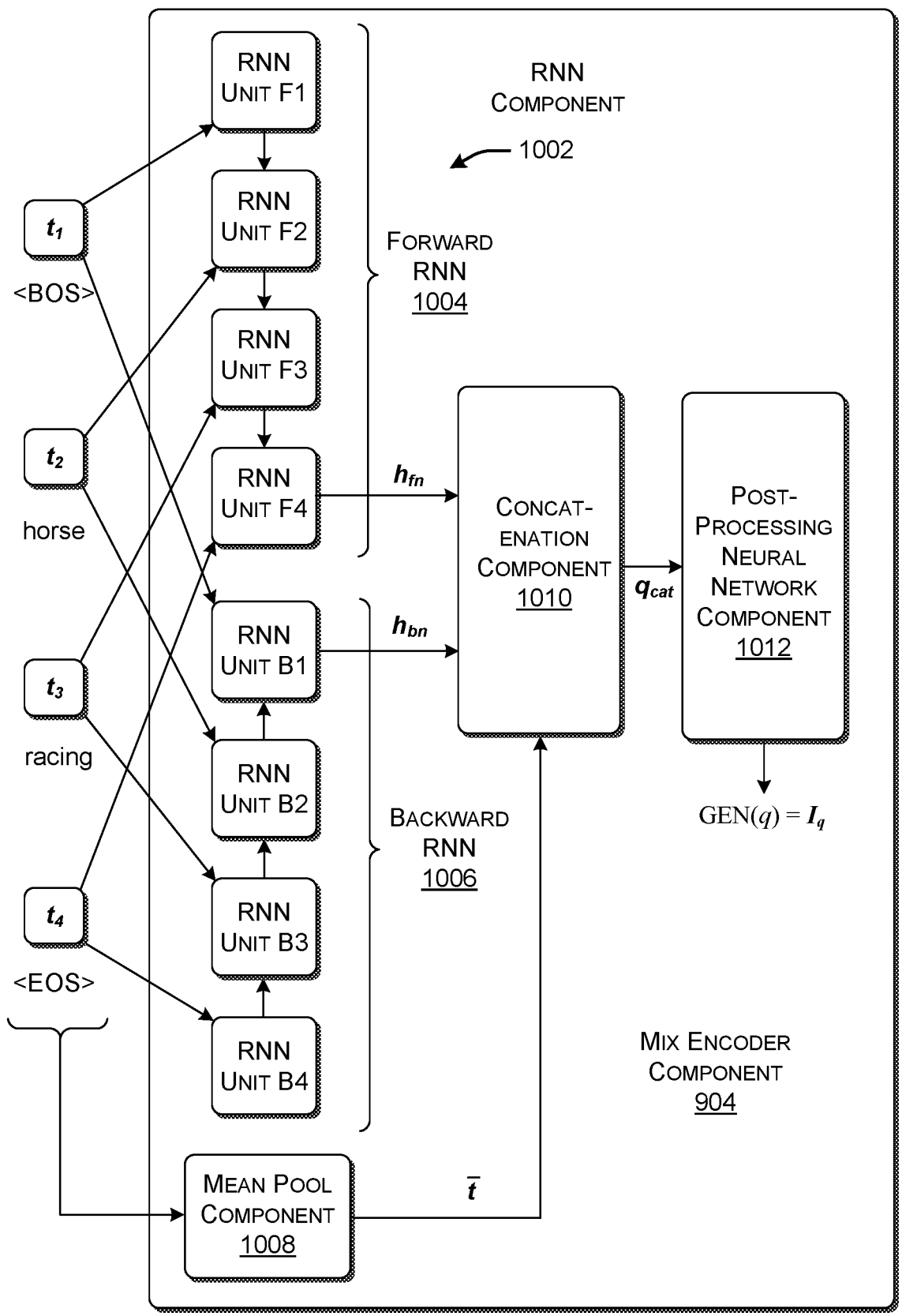

FIG. 9 shows one implementation of the intent-generating component 128. From a high-level perspective, the intent encoder component 1128 uses a term-embedding component 902 to generate a term vector t for each term t in the an input query q. Here, the input query corresponds to the phrase "horse racing," and its individual terms (also referred to as tokens) correspond to "horse" and "racing." A mix encoder component 904 generates an intent vector $I_q$ based on the term vectors produced by the term-embedding component 902. FIG. 9 shows one illustrative implementation of the term-embedding component 902, while FIG. 10 shows one illustrative implementation of the mix encoder component 904.

Beginning with FIG. 9, the term-embedding component 902 includes two parts. A first part 906 processes each term of the query q as a whole, while a second part 908 operates on each term in a character-level of granularity, e.g., by taking into consideration the morphology of its combination of characters. The second part 908 is particularly useful for the case of a rarely-encountered word; in that situation, the second part 908 extracts meaningful information for the term by judging it against other terms with similar spellings.

As to the first part 906, a word embedding component 910 first converts the input term (here, "horse") into an embedding $t_{emb}$ using an embedding table. The embedding $t_{emb}$ corresponds to a vector representation of the input term t. In one case, the word embedding component 910 relies on a static lookup table which maps terms in a natural language vocabulary to vectors. For example, in an offline operation, a neural network can map each term in the vocabulary to its vector form, thus populating the lookup table. In another case, the training framework 116 learns the embedding table as part of its iterative generation of the machine-trained model that underlies the intent-generating component 128.

A neural network component 912 transforms each embedding $t_{emb}$ into an output vector $t_{hy}$ per the non-limiting equation:

$$t_{hy} = \text{highway}^t(t_{emb}; g_{hy}^t, p_{hy}^t) = g_{hy}^t(t_{emb}) \times p_{hy}^t(t_{emb}) + (1 - g_{hy}^t(t_{emb})) \times t_{emb}. \quad (2)$$

This equation provides a non-linear projection, together with a gate which controls the projection. The projection and gate are defined by Equations (3) and (4) below, respectively:

$$p_{hy}^t = relu(w_{p_{hy}^t} \times t_{emb}), \quad (3)$$

$$g_{hy}^t(t_{emb}) = sigmoid(w_{g_{hy}^t} \times t_{emb}). \quad (4)$$

The symbols $$w_{p_{hy}^t} \text{ and } w_{g_{hy}^t}$$

in Equations (3) and (4), respectively, refer to machine-learned parameter values. "relu" and "sigmoid" refer to the names of two activation functions. Note that this particular kind of neural network is referred to in the art as a highway network.

The second part 908 begins by using a character embedding component 914 to produce a character vector c for each term in the query under consideration, that is, by generating a first character vector $c_1$ for the character "h," a second character vector $c_2$ for the character "o," and so on. Like the word embedding component 910, the character embedding component 914 can use a pre-generated lookup table to perform this task, which maps characters to vectors. Or the character embedding component 914 can learn its embedding table as part of the training performed by the training framework 116.

A convolution and pooling component (CPC) 916 next moves an n-character window across the sequence of character vectors. At each window position, it generates an n-character-combination vector which combines together the n characters encompassed by the window at that given position. For example, for n=3, and for one window position, the CPC 916 can form an n-character-combination vector by concatenating the three character vectors for "h," "o," and "r." The CPC 916 can then transform each n-character-combination vector by multiplying it by a machine-learned weighting matrix. Overall this yields a plurality of intermediate vectors. The CPC 916 then condenses the plurality of intermediate vectors into a global vector $t_C$ using any type of down-sampling strategy. For example, the CPC 916 can select a maximum value across each dimension of the intermediate vectors fed to it, to form the global character vector $t_C$.

A second neural network component 918 transforms the character vector $t_C$ into an output vector $t_{C_{hy}}$ using the same kind of transformation described above with respect to Equations (2)-(4), but with respect to different machine-learned parameter values (e.g., here, $p_{hy}^C$ and $g_{hy}^C$). The second neural network component 918 can also optionally use two (or more) layers of the neural network described in Equations (2)-(4). In this case, any layer w operates on the output result provided by the previous layer w−1.

Finally, a concatenation component 920 concatenates the output result of the first part 906 ($t_{hy}$) with the output result of the second part 908 ($t_{C_{hy}}$), to produce the final term vector t. Note that the architecture of the term-embedding component 902 can be varied in different ways, such as by using standard feed-forward neural network components in place of the particular types of neural network components (912, 918).

Advancing to FIG. 10, the mix encoder component 904 receives as input signals the set of term vectors produced by the term-embedding component 902. These term vector include a first term vector $t_1$ associated with a dummy symbol <BOS> that marks the beginning of the query, and a fourth term vector $t_4$ associated with a dummy symbol <EOS> that marks the end of the query. Term vector $t_2$ corresponds to the word "horse," while term vector $t_3$ corresponds to the word "racing."

A recurrent neural network (RNN) component 1002 operates on the term vectors to produce two hidden state vectors ($h_{fn}$, $h_{bn}$). More specifically, the RNN component 1002 is a bi-directional RNN that passes hidden state information in both forward and backward directions. That is, the RNN component 1002 incudes a forward RNN component 1004 that passes hidden state information in a forward direction from one RNN unit to the next RNN in a sequence of RNN units. The final RNN unit in the forward RNN component 1004 produces a hidden state vector $h_{fn}$. A backward RNN component 1006 passes hidden state information in a backward direction from one RNN unit to the next RNN in a sequence of RNN units. The final RNN unit in the backward RNN component 1006 produces a hidden state vector $h_{bn}$. Each RNN unit in each RNN component also receives an input signal from one of the term vectors. For instance, the first RNN unit F1 of the forward RNN component 1004 operates on the first term vector $t_1$. Note that, for the purposes of explanation, FIG. 10 illustrates the RNN units in "unrolled" from as discrete elements. But the mix encoder component 904 can implement these RNN units using a single body of code. During execution, that single body of code feeds it output hidden state information (computed at time instance i) as input hidden state information (for time instance i+1). The mix encoder component 904 dynamically expands and contracts the number of RNN calculations it performs based on the number of terms in the input query under consideration.

Each RNN uses its internal logic to produce a hidden state vector, given the hidden state vector output by the previous RNN unit in the chain, and based on the input term vector fed to it. In one implementation, for instance, each RNN unit corresponds to long short-term memory (LSTM) unit which generates its hidden vector $h_i$ based on the equation: ($W_{th}t_i$+$W_{hh}h_{i-1}$+$b_h$), where $t_i$ is the term vector fed to it as input, $h_{i-1}$ is the hidden state vector fed to it from the previous RNN unit, $W_{th}$ and $W_{hh}$ are machine-learned weighting matrices, $b_h$ is a machine-learned bias vector, and $\sigma$ refers to the sigmoid activation function. In another implementation, each RNN unit corresponds to a gated recurrent unit (GRU).

In general, the RNN component 1002 corresponds to a sequential encoder that captures insight from a query which depends on the order in which terms appear in the query. This is useful for term-order-sensitive queries, such as "horse racing" and "racing horse." By contrast, a mean pool component 1008 uses a bag-of-words paradigm to capture the influence of terms in the query independent of the ordering of the terms. In one case, the mean pool component 1008 generates the average I of the n term vectors that are fed to the mix encoder component 904. That is:

$$\bar{t} = \frac{1}{n}\sum_i t_i. \quad (5)$$

Next, a concatenation component 1012 concatenates $h_{fn}$ (the output of the forward RNN component 1004), $h_{bn}$ (the output of the backward RNN component 1006), and I (the output of the mean pool component 1008), to produce a vector $q_{cat}$. A post-processing neural network component 1012 then transforms the vector $q_{cat}$ into the final intent vector $I_q$ using the following equation:

$$I_q = \tanh(q_{cat} + \text{relu}(w_{rs}{}^q \times q_{cat})) \quad (6).$$

The symbol $w_{rs}{}^q$ refers to machine-learned parameter values, and tanh and relu correspond to activation functions. Note that the architecture of the mix encoder component 904 can be varied in many ways, such as by using different kinds of sequential encoder technologies (e.g., besides the bi-directional RNN component 1002 shown in FIG. 10), by using a different post-processing neural network component, etc.

A.4. The Training Framework

Figure 11:
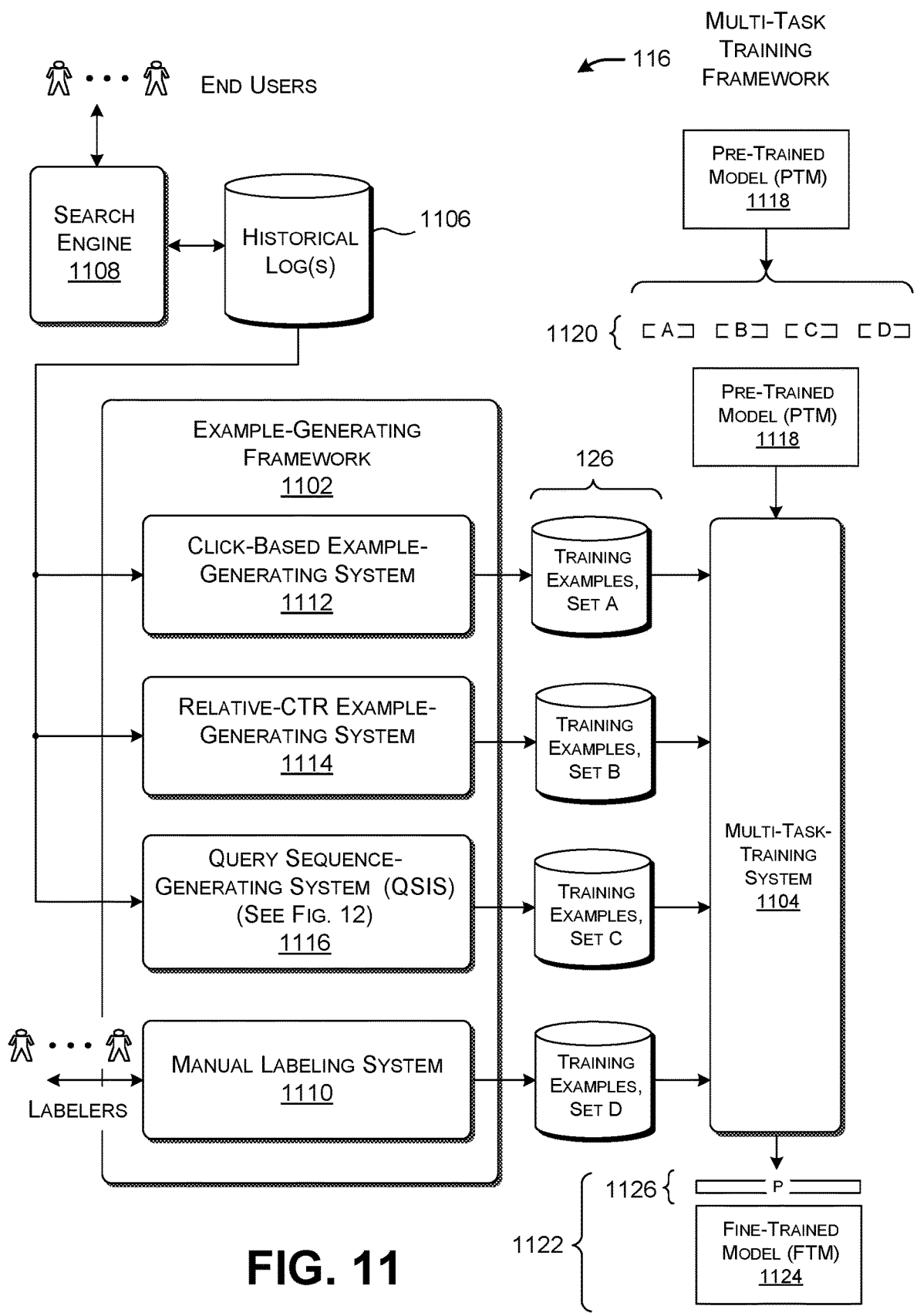
FIG. 11 shows one implementation of a multi-task training framework. The framework produces a machine-trained model for use by the SGCs of FIGS. 6 and 7.

FIG. 11 shows one implementation of the multi-task training framework ("training framework") 116 introduced in the context of the description of FIG. 1. The training framework 116 includes two major components: an example-generating framework 1102 and a multi-task training system ("training system") 1104. The example-generating framework 1102 generates plural groups of training examples using different respective example-generating methods. The example-generating framework 1102 stores the different groups of training examples in the data store 126. The training system 1104 uses a multi-task training approach to generate a machine-trained model based on the different groups of training examples. The suggestion-generating system (SGS) 112 implements its functionality using the machine-trained model provided by the training system 1104.

The example-generating framework 1102 includes different subsystems for generating the different groups of training examples, each of which is described below in turn. At least some of the subsystems interact with one or more historical logs provided in a data store 1106. The historical log(s) reflect the behavior of users who interact with a search engine 1108 over a prescribed period of time, appropriately anonymized to remove any personal data regarding the users who authorize the use of this data. For example, one historical log may describe the queries that each user submits within a search session. The log may also describe the suggestions each user submits over the course of his or her search sessions. For instance, this kind of log may store information that indicates that a user selected (or failed to select) a particular suggestion after submitting a particular query into the search engine 1108.

A manual labeling system 1110 provides a platform that provides a plurality of pairings to a group of human analysts. Each pairing includes a query and a candidate suggestion. The human analysts annotate each pairing with a label that indicates whether or not the suggestion is considered relevant to the query. A positive example corresponds to a case in which the suggestion is considered relevant to the query. A negative example corresponds to a case in which the suggestion is not considered relevant to the query.

A click-based example-generating system 1112 mines a historical click log provided in the data store 1106 to provide its training examples. A training example for this case includes a query that was actually submitted by a user during a search session, a suggestion that was actually served to a user by the search engine 1108 in response to the query, and a label. For a positive example, the label indicates that the user selected the suggestion. For a negative example, the label indicates that the user failed to select the suggestion.

A relative-CTR example-generating system 1114 also generates training examples from the historical click log. But unlike the click-based example-generating system 1112, the relative-CTR example-generating system 1114 computes, for a given query and for a given suggestion under consideration, a rate (e.g., click through rate or CTR) at which a plurality of users clicked on the suggestion after submitting the query. The relative-CTR example-generating system 1114 then find examples in which, for the given query, the rate ($ctr_1$) at which users selected a first suggestion ($s_1$) exceeds a rate ($ctr_2$) at which the user selected a second suggestion ($s_2$) by a prescribed amount c. Note that the relative-CTR example-generating system 114 can normalize each rate by the total number of clicks that the query under consideration has received. Further, the relative-CTR example-generating system 114 can require that each suggestion be clicked at least a predetermined number of times to qualify as a valid suggestion for consideration. A pairing of the query q and the first suggestion ($s_1$) provides a positive example, while a pairing of the query and the second suggestion ($s_2$) constitutes a negative example.

The above types of subsystems were described above for the illustrative case in which each positive and negative example only considers the last-submitted query provided by the user. Alternatively, or in addition, the above subsystems can consider one or more queries which preceded the last-submitted query. Alternatively, or in addition, the above subsystems can consider other contextual factors in producing training examples, such as by incorporating information that describes the environments in which the users submitted their queries.

A query sequence-generating system (QSIS) 1116 produces training examples by identifying sequences of queries submitted by users in prior search sessions. Each sequence is generated by the procedure described below in connection with the explanation of FIGS. 12 and 13. By way of overview, a valid sequence includes a set of queries submitted by a user in a session, where: (1) the set includes at least a predetermined number of queries (such as three); (2) all of the queries in the set express a consistent or coherent intent; and (3) at least one query in the set has triggered the answer-providing engine to automatically provide an answer in the search session. The QSIS 1116 constructs a positive example from a sequence that includes: a first member that identifies all of the queries in the sequence that precede a last-occurring query; a second member that identifies the last-occurring query. The implication of this positive example is that last-occurring query is an appropriate linguistic expression to follow the preceding queries in the sequence.

The QSIS 1116 can construct a negative example in different ways. In one implementation, the QSIS 1116 can replace the actually-occurring last query $q_n$ in the sequence with another randomly-chosen query, under the assumption that it will not cohere with the preceding queries in the sequence. In another implementation, the QSIS 1116 replaces the actually-occurring last query $q_n$ in the sequence with a query z that often follows the next-to-the-last query $q_{n-1}$ in the sequence, but does not follow the next-to-the-last query in the particular sequence under consideration. This type of example forces the training system 1104 to learn how to identify the contexts in which the particular query z is appropriate and those in which it is not, which ultimately results in the production of a more accurate machine-trained model.

Now advancing to the right side of FIG. 11, the training system 1104 can generate the machine-trained model using any training technique, such as stochastic gradient descent, etc. In performing these iterative procedures, the training system 1104 can randomly interleave training examples pulled from different groups of training examples. The training system 1104 can use any loss function in this process, such as, in the case of the classification-type SGC 408, cross entropy loss.

For the case of the generative-type SGC 504, the training system 1104 operates on only positive training examples. For example, the training system 1104 can operate on the following concatenation of tokens associated with a positive training example: qo[SEP]oso[EOS]. The goal of the training system 1104 with respect to this example is to learn parameter values that will enable the generative-type SGC 504 to generate correct next tokens.

In one case, the training system 1104 produces the machine-trained model from "scratch." In another case, the training system 1104 begins training by accepting a pre-trained model 1118. For instance, a pre-training system (not shown) may have produced the pre-trained model 1118 by blocking different tokens in a corpus of linguistic training examples, and then asking the training system to predict the identities of the missing tokens. This pre-training operation yields a language model. The training system 1104 of FIG. 11 operates to fine-tune the parameter values in the pre-trained model 1118.

The training system 1104 can also produces plural "heads" 120 for use in processing training examples provided by different example-generating methods. For instance, the training system 1104 produces a head A for processing training examples produced by the click-based example-generating system 1112, head B for processing the training examples produced by the relative-CTR example-generating system 1114, and so on. Each head can include one or more neural network layers and/or other processing logic.

When performing training based on the training examples of group A, the training system 1104 updates the parameter values of the head A in combination with the parameter values of the pre-trained model 1118. When performing training based on the training examples of group B, the training system 1104 updates the parameter values of the head B in combination with the parameter values of the pre-trained model 1118, and so on. Thus, the training system 1104 can be said to use all four groups of training examples to update the parameter values of the pre-trained model 1118. This has the effect of generalizing and enhancing the knowledge embodied in the parameter values of the pre-trained model 1118.

When training is finished, the training system 1104 outputs a final machine-trained model 1122. The machine-trained model 1122 includes a fine-tuned base model 1124, which corresponds to a fine-tuned counterpart of the pre-trained model 1118. The machine-trained model 1122 can also include a trained head 1126. The head 1126 may correspond to the header logic that has been trained for a particular example-generating method, such as the example-generating method used by the click-based example-generating system 1112. In another implementation, the head 1126 can be built from a combination (e.g., a linear combination) of all four heads learned in the training operation.

Figure 12:
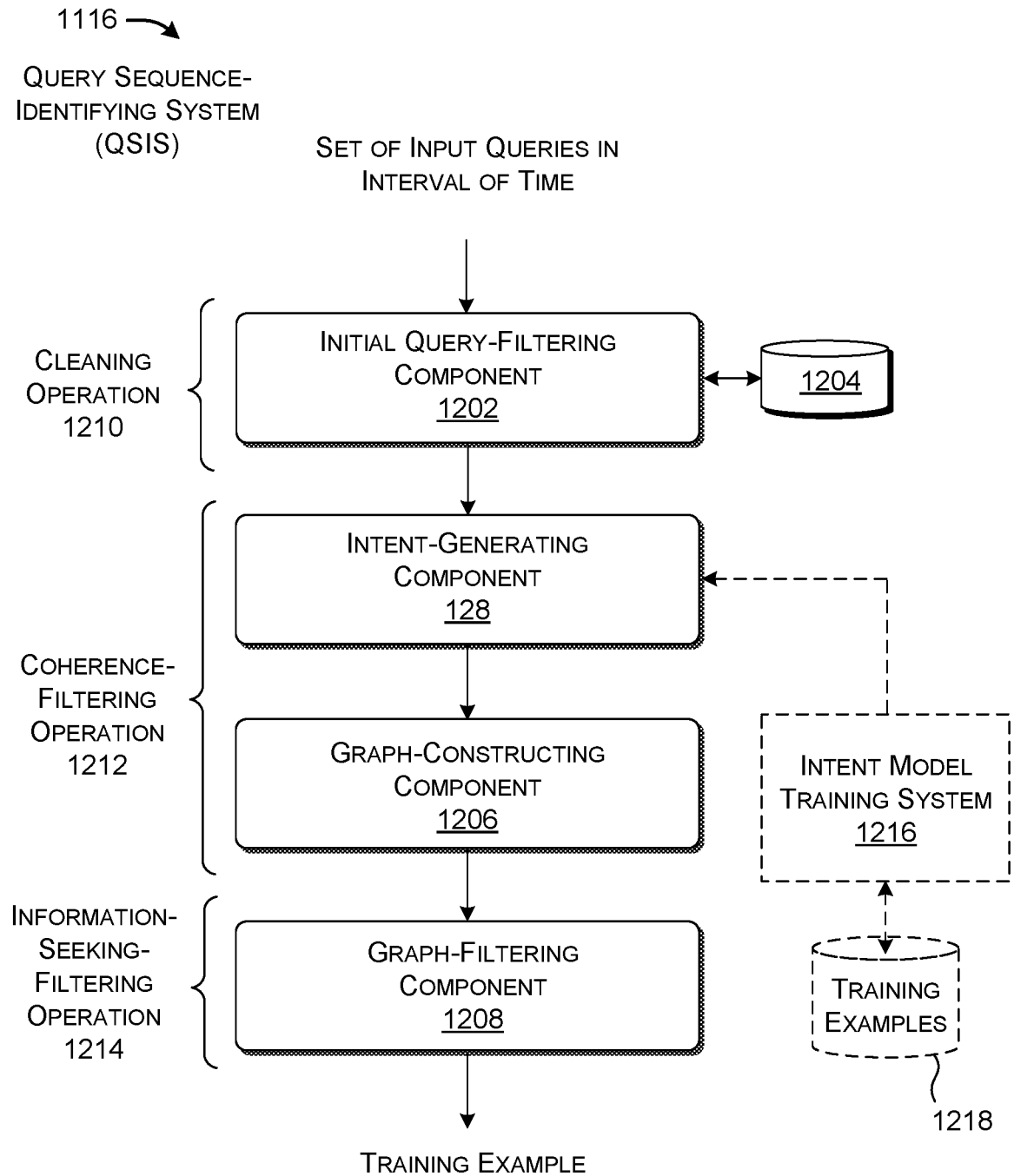
FIG. 12 shows one implementation of a query sequence-identifying system (QSIS), which is one component of the multi-task training framework of FIG. 11.

FIG. 12 shows one implementation of the query sequence-identifying system (QSIS) 1116, which is one of the subsystems introduced above in the description of the training framework 116. The QSIS 1116 operates in a succession of stages to generate training examples. The input to the QSIS 1116 includes a set of queries that a particular user has submitted within a prescribed interval of time Δt (e.g., 30 minutes) in a search session. In one implementation, the QSIS 1116 can move a sliding window of 30 minutes across the entire search session (presuming that the search session has a total duration of longer than 30 minutes), advancing the window by a fixed increment each time (such as an increment of five minutes). The QSIS 1116 can perform its query-processing analysis (described below) for each position of the window across the search session. In another implementation, the QSIS 1116 can perform its query-processing analysis once for the first 30 minutes of a session, once for minutes 31 to 60 of the search session, and so on. The following explanation will describe the processing that is performed on the queries submitted by a user in the first 30 minutes of a search session.

In a first stage, an initial query-filtering component 1202 filters out queries in the window that do not meet prescribed criteria. For example, the initial query-filtering component 1202 can filter out queries that evince a navigational intent, and queries that are likely directed to excluded topics. The initial query-filtering component 1202 can use any combination of techniques to identify these types of queries. For example, the initial query-filtering component 1202 can exclude queries that have a high frequency (meaning a number of occurrences above a prescribed threshold value), based on the assumption that these kinds of queries likely correspond to navigation-type queries. In addition, or alternatively, the initial query-filtering component 1202 can exclude queries that include telltale forbidden keywords, or which map to forbidden regions in a semantic vector space, etc. A data store 1204 can store information regarding the queries that should be excluded, such as by providing a list of excluded queries, keywords, query features, etc.

The intent-generating component 128, described in Subsection A.3, maps each remaining query to an intent vector in an intent vector space. A graph-constructing component 1206 then determines the distance between the intent vectors associated with each possible pairing of queries. The graph-constructing component 1206 can compute this distance using any metric, such as cosine similarity. The graph-constructing component 1206 then forms one or more subgraphs by connecting pairs of queries having intent vectors separated by no more than a prescribed distance in intent-related vector space. Each query in a subgraph is connected by an edge to at least one other query in the subgraph based on the above criterion. The graph-constructing component 1206 can retain only those subgraphs having a prescribed number of queries (such as three queries). This criterion ensures that a subgraph reflects a significant focus of attention within a search session.

A graph-filtering component 1208 eliminates all subgraphs that do not contain at least one query that triggered the answer-providing engine to provide at least one answer to a query. For example, assume that one of the queries in a subgraph was, "How fast is the Nissan GT-R?" The answer-providing engine can respond to the query by providing information in the section 208 (of FIG. 2) that informs the user that the top speed is 313.8 miles per hour. The subgraph in which this query appears will therefore pass the test provided by the graph-filtering component 1208.

Finally, the graph-filtering component 1208 chooses the subgraph having the greatest number of queries, and which meets all of the other tests set forth above. The graph-filtering component 1208 generates a positive training example based on the queries in the subgraph in the manner described above, e.g., by treating the queries in the subgraph other than the last-occurring query ($q_n$) as a first member of a pairing, and considering the last-occurring query ($q_n$) as a second member of the pairing.

From a more encompassing standpoint, the initial query-filtering component 1202 performs a cleaning operation 1210 by removing inappropriate queries from the window of queries. The intent-generating component 128 and the graph-constructing component 1206 perform a coherence-filtering operation 1212, that is, by finding at least one sequence of queries that exhibit a coherent or consistent intent-related focus during the search session. The graph-filtering component 1208 performs an information-seeking filtering operation 1214 by retaining only those sequences for which there is some evidence that the intent of the user's search is to obtain information.

FIG. 12 also indicates that another training system 1216 can produce the intent-generating component 128 by operating on a corpus of training examples in a data store 1218. In one implementation, an example-generating system (not shown) culls the training examples from a click log provided by a search engine. The training examples include positive examples and negative examples. Each positive example describes a pair of prior queries that resulted in selection of a same document (that is, a same URL). Each negative example describes a pair of prior queries that did not result in selection of a same document. The training system 1216 generates a machine-trained model for use by the intent-generating component 128 by iteratively decreasing distances in the intent vector space between intent vectors associated with positive examples, and iteratively increasing distances in the intent vector space between intent vectors associated with negative examples.

FIG. 13 shows an example of the operation of the QSIS of FIG. 12. Here, the QSIS 1116 identifies a 30-minute window of time in a search session conducted by a particular user. Assume that the window includes twelve queries, although the window can generally include any number of queries above a prescribed lower-limit number of queries. The initial query-filtering component 1202 removes queries $q_1$, $q_4$, and $q_{10}$ because these queries do not satisfy its specified retention test. The intent-generating component 128 generates intent vectors for all of the remaining queries in the window of time. For instance, the intent-generating component 128 generates an intent vector $I_{q2}$ for the second query $q_2$. The graph-constructing component 1206 computes the distance between each pair of queries, and produces an edge between queries having intent vectors that are separated by no more than a prescribed distance (e.g., as measured by cosine similarity). FIG. 13 shows that this process produces two clusters or subgraphs in intent-related vector space 1302, including a first subgraph 1304 that includes queries $q_2$, $q_3$, $q_5$, and $q_6$, and a second subgraph 1306 that includes queries $q_7$, $q_8$, and $q_9$. Queries $q_{11}$ and $q_{12}$ are not members of any subgraph having the minimum threshold number of three or more members.

The graph-filtering component 1208 selects the subgraph 1304 because it includes more queries than the other subgraph 1306. The subgraph 1304 also satisfies the test that requires it to include at least one query (here, $q_6$) that triggered the answer-providing engine to generate an answer. The subgraph 1306 does not meet this test. In another implementation, the QSIS 116 can cull plural examples from a single window of time, associated with plural respective qualifying subgraphs.

Finally, the QSIS 1116 generates a training example 1308 based on the subgraph 1304. The training example 1308 includes a concatenation of the queries that precede the last-occurring query in the sequence (here, queries $q_2$, $q_3$, and $q_5$) with the last-occurring query in the sequence (here, query q).

The training framework 116 is advantageous for several reasons. First, the training framework 116 uses a single process to train a single model based on plural groups of training examples. For this reason, the model thus produced may be referred to as a multi-task-trained model. This behavior makes the training framework 116 more efficient compared an alternative approach that involves training plural single-task-trained models, each being produced using a single dedicated set of training examples that is generated via a single example-generating process. That is, the process of training a multi-task-trained model based on plural groups of training examples may take less time than training plural dedicated models, and may consume less computing resources (e.g., processing, memory, and storage resources). Second, the training framework 116 produces a multi-task-trained model that embodies more insight than plural single-task-trained models. This is because the training framework 116 forces its multi-task-trained model to perform a more encompassing, varied, and challenging task compared to an alternative training framework that does not use multi-task learning; these heightened demands produce a more powerful model compared to single-task-trained models.

B. Illustrative Processes

FIGS. 14-17 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIG. 14 shows a process 1402 that provides an overview of the operation of the query-processing system 106 of FIG. 1. In block 1404, the query-processing system 106 receives a query provided by the user computing device 104, via a computer network 110. In block 1406, the query-processing system 106 generates at least one suggestion based on the query using the first machine-trained model. The first machine-trained model is trained using the multi-task training framework 116 that interleaves training examples selected from plural groups of training examples. The plural groups of training examples are produced by plural example-generating methods that differ from each other. For a first group of training examples, a training example provides a sequence of queries in a search session that have been determined to exhibit a coherent task-related intent. That is, the queries in the sequence of queries are determined to exhibit a coherent task-related intent by using a second machine-trained model to identify intents associated with the respective queries, and then determining relationships among the intents. In block 1408, the query-processing system 106 generates output information to be sent to the user computing device 104 that includes the at least one suggestion, and sends the output information to the user computing device. In block 1410, the query-processing system 106 receives a reply from the user to the at least one suggestion in response to interaction by the user with a user interface provided by the user computing device 104. The computer-implemented method overall guides the user towards a completion of an inferred task through a succession of suggestions.

FIG. 15 shows a process 1502 that provides an overview of the operation of the training framework 116 of FIG. 11, by which the first machine-trained model is produced. In block 1504, the training framework 116 generates plural groups of training examples using plural example-generating methods that differ from each other. For a first group of training examples, a training example provides a sequence of queries that have been determined to exhibit a coherent task-related intent. That is, the queries in the sequence of queries are determined to exhibit a coherent task-related intent by using a second machine-trained model to identify intents associated with the respective queries, and then determining relationships among the intents. In block 1506, the training framework 116 generates a first machine-trained model by performing multi-task learning by interleaving examples selected from among the plural groups of training examples. The first machine-trained model is used during inference-stage processing to map at least one query submitted by a user into at least one suggestion.

Figure 17:
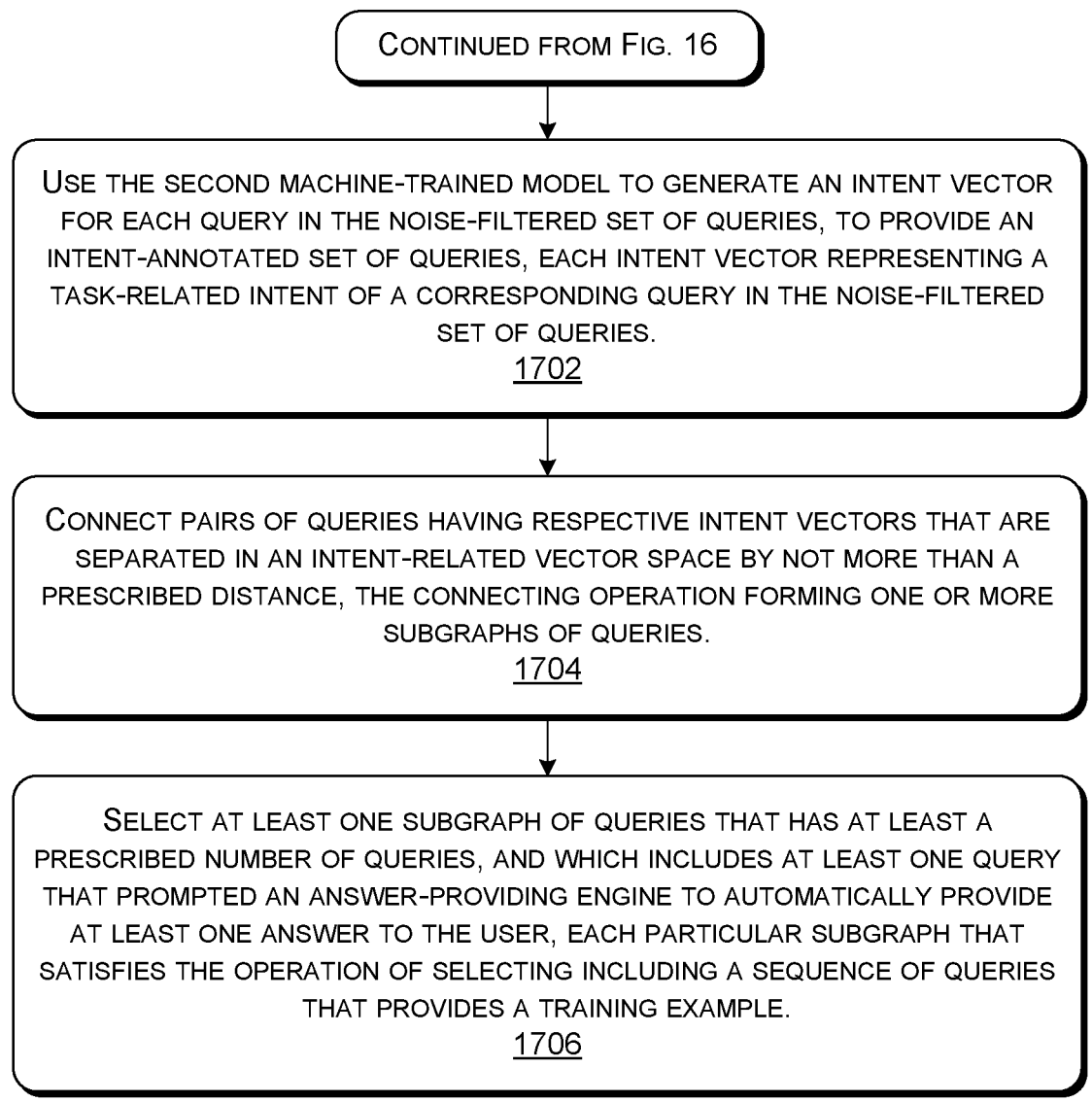

FIGS. 16 and 17 together shows a process 1602 that provides an overview of the operation of the sequence-identifying system (QSIS) 1116 of FIGS. 11 and 12. In block 1604, the QSIS 1116 receives an initial set of queries submitted by a user in a search session within a prescribed amount of time (e.g., 30 minutes). In block 1606, the QSIS 1116 removes one or more queries in the initial set of queries that do not satisfy a query retention test, to provide a noise-filtered set of queries. In block 1702, the QSIS 1116 uses the second machine-trained model to generate an intent vector for each query in the noise-filtered set of queries, to provide an intent-annotated set of queries, each intent vector representing a task-related intent of a corresponding query in the noise-filtered set of queries. In block 1704, the QSIS 1116 connects pairs of queries having respective intent vectors that are separated in an intent-related vector space by not more than a prescribed distance, the connecting operation forming one or more subgraphs of queries. In block 1706, the QSIS 1116 selects at least one subgraph of queries that has at least a prescribed number of queries, and which includes at least one query that prompted an answer-providing engine to automatically provide at least one answer to the user. Each particular subgraph that satisfies the operation of selecting (in block 1706) includes a sequence of queries that provides a training example.

C. Representative Computing Functionality

Figure 18:
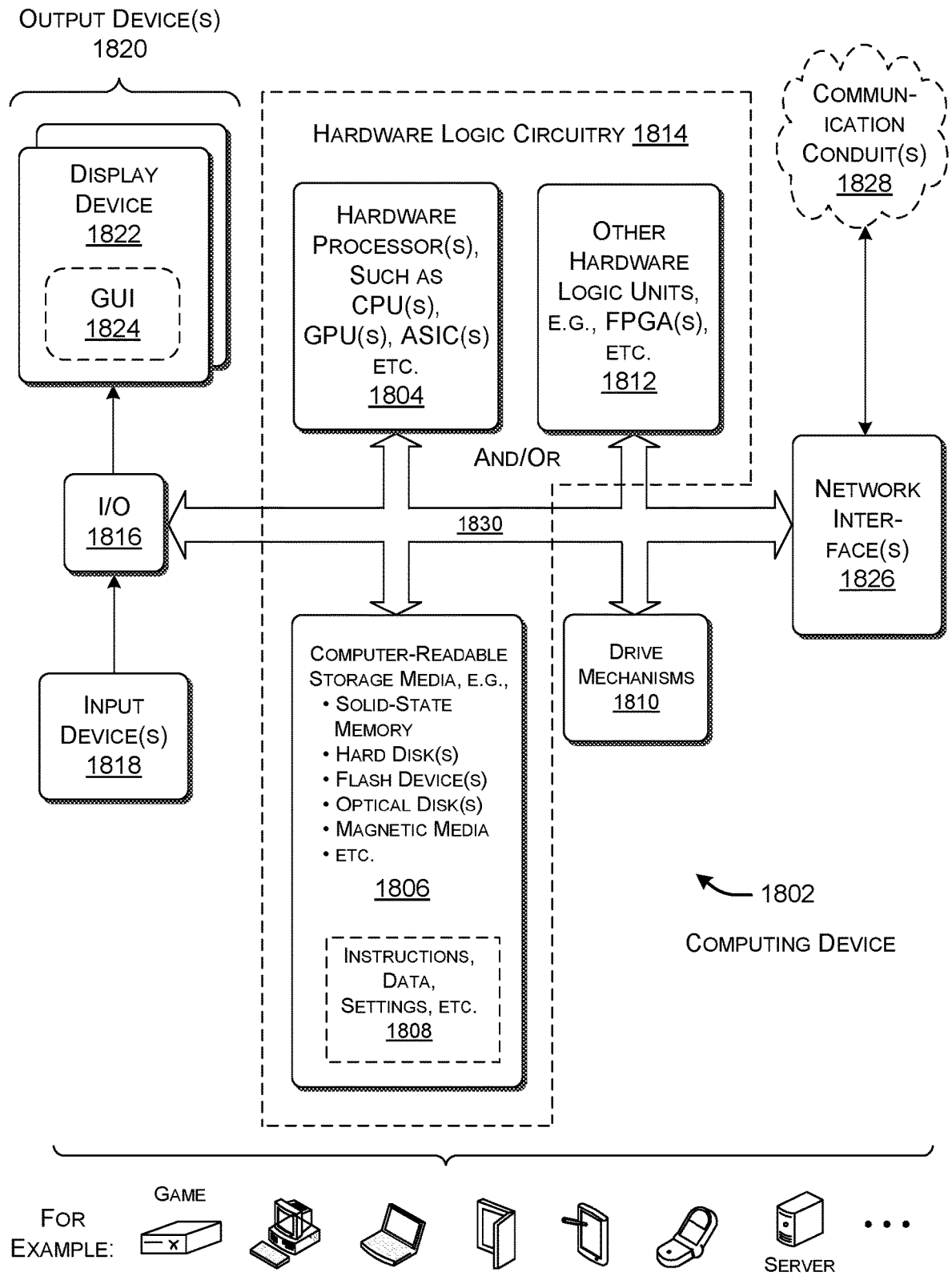
FIG. 18 shows an illustrative type of computing device that can be used to implement any aspect of the features shown in the foregoing drawings.

FIG. 18 shows a computing device 1802 that can be used to implement any aspect of the mechanisms set forth in the above-described figures. For instance, with reference to FIG. 1, the type of computing device 1802 shown in FIG. 18 can be used to implement any user computing device and any server. In all cases, the computing device 1802 represents a physical and tangible processing mechanism.

The computing device 1802 can include one or more hardware processors 1804. The hardware processor(s) 1804 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1802 can also include computer-readable storage media 1806, corresponding to one or more computer-readable media hardware units. The computer-readable storage media 1806 retains any kind of information 1808, such as machine-readable instructions, settings, data, etc. Without limitation, for instance, the computer-readable storage media 1806 may include one or more solid-state devices, one or more magnetic hard disks, one or more optical disks, magnetic tape, and so on. Any instance of the computer-readable storage media 1806 can use any technology for storing and retrieving information. Further, any instance of the computer-readable storage media 1806 may represent a fixed or removable unit of the computing device 1802. Further, any instance of the computer-readable storage media 1806 may provide volatile or non-volatile retention of information.

The computing device 1802 can utilize any instance of the computer-readable storage media 1806 in different ways. For example, any instance of the computer-readable storage media 1806 may represent a hardware memory unit (such as Random Access Memory (RAM)) for storing transient information during execution of a program by the computing device 1802, and/or a hardware storage unit (such as a hard disk) for retaining/archiving information on a more permanent basis. In the latter case, the computing device 1802 also includes one or more drive mechanisms 1810 (such as a hard drive mechanism) for storing and retrieving information from an instance of the computer-readable storage media 1806.

The computing device 1802 may perform any of the functions described above when the hardware processor(s) 1804 carry out computer-readable instructions stored in any instance of the computer-readable storage media 1806. For instance, the computing device 1802 may carry out computer-readable instructions to perform each block of the processes described in Section B.

Alternatively, or in addition, the computing device 1802 may rely on one or more other hardware logic units 1812 to perform operations using a task-specific collection of logic gates. For instance, the hardware logic unit(s) 1812 may include a fixed configuration of hardware logic gates, e.g., that are created and set at the time of manufacture, and thereafter unalterable. Alternatively, or in addition, the other hardware logic unit(s) 1812 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 18 generally indicates that hardware logic circuitry 1814 includes any combination of the hardware processor(s) 1804, the computer-readable storage media 1806, and/or the other hardware logic unit(s) 1812. That is, the computing device 1802 can employ any combination of the hardware processor(s) 1804 that execute machine-readable instructions provided in the computer-readable storage media 1806, and/or one or more other hardware logic unit(s) 1812 that perform operations using a fixed and/or programmable collection of hardware logic gates. More generally stated, the hardware logic circuitry 1814 corresponds to one or more hardware logic units of any type(s) that perform operations based on logic stored in and/or otherwise embodied in the hardware logic unit(s).

In some cases (e.g., in the case in which the computing device 1802 represents a user computing device), the computing device 1802 also includes an input/output interface 1816 for receiving various inputs (via input devices 1818), and for providing various outputs (via output devices 1820). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1822 and an associated graphical user interface presentation (GUI) 1824. The display device 1822 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1802 can also include one or more network interfaces 1826 for exchanging data with other devices via one or more communication conduits 1828. One or more communication buses 1830 communicatively couple the above-described units together.

The communication conduit(s) 1828 can be implemented in any manner, e.g., by a local area computer network, a wide area computer network (e.g., the Internet), point-to-point connections, etc., or any combination thereof. The communication conduit(s) 1828 can include any combination of hardwired links, wireless links, routers, gateway functionality, name servers, etc., governed by any protocol or combination of protocols.

FIG. 18 shows the computing device 1802 as being composed of a discrete collection of separate units. In some cases, the collection of units may correspond to discrete hardware units provided in a computing device chassis having any form factor. FIG. 18 shows illustrative form factors in its bottom portion. In other cases, the computing device 1802 can include a hardware logic unit that integrates the functions of two or more of the units shown in FIG. 1. For instance, the computing device 1802 can include a system on a chip (SoC or SOC), corresponding to an integrated circuit that combines the functions of two or more of the units shown in FIG. 18.

The following summary provides a non-exhaustive set of illustrative examples of the technology set forth herein.

According to a first example, a computer-implemented method is described for assisting a user in performing a task. The method includes receiving a query provided by a user computing device, via a computer network, and generating at least one suggestion based the query using a first machine-trained model. The first machine-trained model is trained using a multi-task training framework that interleaves training examples selected from plural groups of training examples. The plural groups of training examples are produced by plural example-generating methods that differ from each other. For a first group of training examples, a training example provides a sequence of queries in a search session that have been determined to exhibit a coherent task-related intent by: using a second machine-trained model to identify intents associated with the respective queries; and then determining relationships among the intents. The method also includes generating output information to be sent to the user computing device that includes the at least one suggestion, and sending the output information to the user computing device. The method then includes receiving a reply from the user to the at least one suggestion in response to interaction by the user with a user interface provided by the user computing device. Overall, the computer-implemented method guides the user towards a completion of an inferred task through a succession of suggestions.

According to a second example, a classification-type neural network implements the first machine-trained model, and wherein the generating at least one suggestion includes: generating an initial set of candidate suggestions based on the query; for each candidate suggestion, using the classification-type neural network to generate a ranking score that identifies an extent to which the candidate suggestion is appropriate for the query; and providing one or more candidate suggestions having respective top-ranked scores.

According to a third example, relating to the second example, the classification-type neural network accepts input information that includes the query concatenated with the candidate suggestion.

According to a fourth example, a generative-type neural network implements the first machine-trained model. The operation of generating at least one suggestion includes using the generative-type neural network to serially generate tokens of a suggestion by serially processing tokens of the query.

According to a fifth example, a transformer-based neural network implements the first machine-trained model.

According to a sixth example, the training framework generates each training example in the first group of training examples by: receiving an initial set of queries submitted by a user in a search session within a prescribed amount of time; removing one or more queries in the initial set of queries that do not satisfy a query retention test, to provide a noise-filtered set of queries; using the second machine-trained model to generate an intent vector for each query in the noise-filtered set of queries, to provide an intent-annotated set of queries, each intent vector representing a task-related intent of a corresponding query in the noise-filtered set of queries; connecting pairs of queries having respective intent vectors that are separated in an intent-related vector space by not more than a prescribed distance, the operation of connecting forming one or more subgraphs of queries; and selecting at least one subgraph of queries that has at least a prescribed number of queries, and which includes at least one query that prompted an answer-providing engine to automatically provide at least one answer to the user. Each particular subgraph that satisfies the operation of selecting includes a sequence of queries that provides a training example.

According to seventh example, the particular subgraph (mentioned in the sixth example) include a temporally last-submitted query and two or more queries that temporally precede the last-submitted query, and the training example associated with the particular subgraph produces a pairing having: a first member that includes the two or more queries; and a second member that is the last-submitted query.

According to an eighth example, the plural groups of training examples include another group of training examples, wherein a training example in the other group includes a pairing having: a particular query previously submitted by at least one previous user; and a particular suggestion previously selected by the at least one previous user in response to submitting the particular query.

According to a ninth example, the plural groups of training examples include another group of training examples, wherein a training example in the other group includes a pairing having a particular query and a particular suggestion, together with a label provided by a human analyst that indicates an extent to which the particular suggestion is appropriate for the particular query.

According to a tenth example, the plural groups of training examples include another group of training examples, wherein a training example in the other group includes a particular query submitted by at least one previous user, a positive-labeled suggestion, and a negative-labeled suggestion, the positive-labeled suggestion having been chosen by the at least one previous user at a first rate, the negative-labeled suggestion having been chosen by the at least one previous user at a second rate, the first rate exceeding the second rate by a prescribed amount.

According to an eleventh example, a computer-readable storage medium is described for storing computer-readable instructions. The computer-readable instructions, when executed by one or more hardware processors, perform a method for generating a first machine-trained model. The method includes generating plural groups of training examples using plural example-generating methods that differ from each other. For a first group of training examples, a training example provides a sequence of queries in a search session that have been determined to exhibit a coherent task-related intent by: using a second machine-trained model to identify intents associated with the respective queries; and then determining relationships among the intents. The method also includes generating the first machine-trained model by performing multi-task learning by interleaving examples selected from among the plural groups of training examples. The first machine-trained model is used during inference-stage processing to map at least one query submitted by a user into at least one suggestion.

According to a twelfth example, relating to the eleventh example, the first machine-trained model is used by a classification-type neural network to generate a ranking score given a particular query submitted by the user and a candidate suggestion, the ranking score identifying an extent to which the candidate suggestion is appropriate for the particular query.

According to a thirteenth example, relating to the eleventh example, the first machine-trained model is used by a generative-type neural network to serially generate tokens of a suggestion by serially processing tokens of a particular query submitted by the user.

According to a fourteenth example, relating to the eleventh example, the first machine-trained model is used by a transformer-based neural network.

According to a fifteenth example, relating to the eleventh example, the method includes generating the first group of training examples by: receiving an initial set of queries submitted by a user in a search session within a prescribed amount of time; removing one or more queries in the initial set of queries that do not satisfy a query retention test, to provide a noise-filtered set of queries; using the second machine-trained model to generate an intent vector for each query in the noise-filtered set of queries, to provide an intent-annotated set of queries, each intent vector representing a task-related intent of a corresponding query in the noise-filtered set of queries; connecting pairs of queries having respective intent vectors that are separated in an intent-related vector space by not more than a prescribed distance, the operation of connecting forming one or more subgraphs of queries; and selecting at least one subgraph of queries that has at least a prescribed number of queries, and which includes at least one query that prompted an answer-providing engine to automatically provide at least one answer to the user. Each particular subgraph that satisfies the operation of selecting includes a sequence of queries that provides a training example.

According to a sixteenth example, relating to the eleventh example, the plural groups of training examples include another group of training examples, wherein a training example in the other group includes a pairing of a particular query previously submitted by at least one previous user and a particular suggestion previously selected by the at least one previous user in response to submitting the particular query.

According to a seventeenth example, relating to the eleventh example, the plural groups of training examples include another group of training examples, wherein a training example in the other group includes a pairing have a particular query and a particular suggestion, together with a label provided by a human analyst that indicates an extent to which the particular suggestion is appropriate for the particular query.

According to an eighteenth example, relating to the eleventh example, the plural groups of training examples include another group of training examples, wherein a training example in the other group includes a particular query submitted by at least one previous user, a positive-labeled suggestion, and a negative-labeled suggestion, the positive-labeled suggestion having been chosen by the at least one previous user at a first rate, the negative-labeled suggestion having been chosen by the at least one previous user at a second rate, the first rate exceeding the second rate by a prescribed amount.

According to a nineteenth example, one or more computing devices are described for assisting a user in performing a task. The computing device(s) include hardware logic circuitry, the hardware logic circuitry being configured to implement a method that includes receiving a query provided by a user computing device, via a computer network, and generating at least one suggestion based on the query using a first machine-trained model. The first machine-trained model is trained using a multi-task training framework that interleaves training examples selected from plural groups of training examples. The plural groups of training examples are produced by plural example-generating methods that differ from each other. For a first group of training examples, a training example provides a sequence of queries in a search session that have been determined to exhibit a coherent task-related intent by: using a second machine-trained model to identify intents associated with the respective queries; connecting pairs of queries that are separated by no more than a prescribed distance in an intent-related vectors space, to form one or more subgraphs; and identifying at least one subgraph that meets a prescribed test; and generating output information to be sent to the user computing device that includes the at least one suggestion. The method then includes receiving a reply from the user to the at least one suggestion in response to interaction by the user with a user interface provided by the user computing device. Overall, the computer-implemented method guides the user towards a completion of an inferred task through a succession of suggestions According to a twentieth example, relating to the nineteenth example, a transformer-based neural network implements the first machine-trained model.

A twenty-first example corresponds to any combination (e.g., any logically consistent permutation or subset) of the above-referenced first through twentieth examples.

A twenty-second example corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for assisting a user in performing a task, comprising:
   receiving a query provided by a user computing device, via a computer network;
   generating at least one suggestion based on the query using a first machine-trained model, the first machine-trained model being trained using a multi-task training framework that performs machine training based on plural groups of training examples,
   the plural groups of training examples being produced by plural example-generating methods that differ from each other,
   for a first group of training examples, a particular training example providing a sequence of plural queries submitted in a prior search session and stored in a historical log that have been determined by the training framework to exhibit a coherent task-related intent by: using a second machine-trained model to identify intents associated with the respective queries; and then determining relationships among the intents;
   generating output information to be sent to the user computing device that includes said at least one suggestion, and sending the output information to the user computing device; and
   receiving a reply from the user to said at least one suggestion in response to interaction by the user with a user interface provided by the user computing device.

2. The computer-implemented method of claim 1, wherein a classification-type neural network implements the first machine-trained model, and wherein said generating at least one suggestion includes:
   generating an initial set of candidate suggestions based on the query;
   for each candidate suggestion in the initial set, using the classification-type neural network to generate a ranking score that identifies an extent to which the candidate suggestion is appropriate for the query; and
   providing one or more candidate suggestions from the initial set having respective top-ranked scores.

3. The computer-implemented method of claim 2, wherein, when generating a ranking score for a particular candidate suggestion from the initial set, the classification-type neural network accepts input information that includes the query concatenated with the particular candidate suggestion.

4. The computer-implemented method of claim 1, wherein a generative-type neural network implements the first machine-trained model, and wherein said generating at least one suggestion includes using the generative-type neural network to serially generate tokens of a suggestion by serially processing tokens of the query.

5. The computer-implemented method of claim 1, wherein a transformer-based neural network having an attention mechanism implements the first machine-trained model.

6. The computer-implemented method of claim 1, wherein the training framework generates each training example in the first group of training examples by:
receiving an initial set of queries submitted by a user in a search session within a prescribed amount of time;
removing one or more queries in the initial set of queries that do not satisfy a query retention test, to provide a noise-filtered set of queries;
using the second machine-trained model to generate an intent vector for each query in the noise-filtered set of queries, to provide an intent-annotated set of queries, each intent vector representing a task-related intent of a corresponding query in the noise-filtered set of queries;
connecting pairs of queries having respective intent vectors that are separated in an intent-related vector space by not more than a prescribed distance, said connecting forming one or more subgraphs of queries; and
selecting at least one subgraph of queries that has at least a prescribed number of queries, and which includes at least one query that prompted an answer-providing engine to automatically provide at least one answer to the user,
each particular subgraph that satisfies said selecting including a sequence of queries that provides a training example.

7. The computer-implemented method of claim 6, wherein the particular subgraph include a temporally last-submitted query and two or more queries that temporally precede the last-submitted query, and wherein the training example associated with the particular subgraph produces a pairing having: a first member that includes said two or more queries; and a second member that is the last-submitted query.

8. The computer-implemented method of claim 1, wherein the plural groups of training examples include another group of training examples, wherein a training example in the other group includes a pairing having: a particular query previously submitted by at least one previous user; and a particular suggestion previously selected by said at least one previous user in response to submitting the particular query.

9. The computer-implemented method of claim 1, wherein the plural groups of training examples include another group of training examples, wherein a training example in the other group includes a pairing having a particular query and a particular suggestion, together with a label manually provided by a human analyst that indicates an extent to which the human analyst considers the particular suggestion to be appropriate for the particular query.

10. The computer-implemented method of claim 1, wherein the plural groups of training examples include another group of training examples, wherein a training example in the other group includes a particular query submitted by at least one previous user, a positive-labeled suggestion, and a negative-labeled suggestion, the positive-labeled suggestion having been chosen by said at least one previous user at a first rate, the negative-labeled suggestion having been chosen by said at least one previous user at a second rate, the first rate exceeding the second rate by a prescribed amount.

11. A computer-readable storage medium for storing computer-readable instructions, one or more hardware processors executing the computer-readable instructions to perform a method for generating a first machine-trained model by a training framework, the method comprising:
generating plural groups of training examples using plural example-generating methods that differ from each other,
for a first group of training examples, a particular training example providing a sequence of plural queries submitted in a prior search session and stored in a historical log that have been determined by the training framework to exhibit a coherent task-related intent by: using a second machine-trained model to identify intents associated with the respective queries; and then determining relationships among the intents; and
generating the first machine-trained model by performing multi-task learning based on the plural groups of training examples.

12. The computer-readable storage medium of claim 11, wherein the first machine-trained model is used by a classification-type neural network to generate a ranking score given a particular query submitted by the user and a candidate suggestion, the ranking score identifying an extent to which the candidate suggestion is appropriate for the particular query.

13. The computer-readable storage medium of claim 11, wherein the first machine-trained model is used by a generative-type neural network to serially generate tokens of a suggestion by serially processing tokens of a particular query submitted by the user.

14. The computer-readable storage medium of claim 11, wherein the first machine-trained model is used by a transformer-based neural network having an attention mechanism.

15. The computer-readable storage medium of claim 11, wherein the method includes generating the particular training example in the first group of training examples by:
receiving an initial set of queries submitted by a user in a search session within a prescribed amount of time;
removing one or more queries in the initial set of queries that do not satisfy a query retention test, to provide a noise-filtered set of queries;
using the second machine-trained model to generate an intent vector for each query in the noise-filtered set of queries, to provide an intent-annotated set of queries, each intent vector representing a task-related intent of a corresponding query in the noise-filtered set of queries;
connecting pairs of queries having respective intent vectors that are separated in an intent-related vector space by not more than a prescribed distance, said connecting forming one or more subgraphs of queries; and
selecting at least one subgraph of queries that has at least a prescribed number of queries, and which includes at least one query that prompted an answer-providing engine to automatically provide at least one answer to the user,
a particular subgraph that satisfies said selecting including the sequence of queries included in the particular training example.

16. The computer-readable storage medium of claim 11, wherein the plural groups of training examples include another group of training examples, wherein a training example in the other group includes a pairing of a particular query previously submitted by at least one previous user and a particular suggestion previously selected by said at least one previous user in response to submitting the particular query.

17. The computer-readable storage medium of claim 11, wherein the plural groups of training examples include another group of training examples, wherein a training example in the other group includes a pairing having a particular query and a particular suggestion, together with a label manually provided by a human analyst that indicates an extent to which the human analyst considers the particular suggestion to be appropriate for the particular query.

18. The computer-readable storage medium of claim 11, wherein the plural groups of training examples include another group of training examples, wherein a training example in the other group includes a particular query submitted by at least one previous user, a positive-labeled suggestion, and a negative-labeled suggestion, the positive-labeled suggestion having been chosen by said at least one previous user at a first rate, the negative-labeled suggestion having been chosen by said at least one previous user at a second rate, the first rate exceeding the second rate by a prescribed amount.

19. One or more computing devices for assisting a user in performing a task, comprising:
    hardware logic circuitry, the hardware logic circuitry being configured to implement a method that includes:
    receiving a query provided by a user computing device, via a computer network;
    generating at least one suggestion based on the query using a first machine-trained model,
    the first machine-trained model being trained using a multi-task training framework that performs machine training based on plural groups of training examples,
    the plural groups of training examples being produced by plural example-generating methods that differ from each other,
    for a first group of training examples, a particular training example providing a sequence of plural queries submitted in a prior search session and stored in a historical log that have been determined by the training framework to exhibit a coherent task-related intent by: using a second machine-trained model to identify intents associated with the respective queries; connecting pairs of queries that are separated by no more than a prescribed distance in an intent-related vectors space, to form one or more subgraphs; and identifying a particular subgraph that meets a prescribed test;
    generating output information to be sent to the user computing device that includes said at least one suggestion; and
    receiving a reply from the user to said at least one suggestion in response to interaction by the user with a user interface provided by the user computing device.

20. The one or more computing devices of claim 19, wherein the prescribed test involves determining whether there is evidence that the user has submitted the sequence of queries to obtain information.

* * * * *